US012021454B2

United States Patent
Castellano et al.

(10) Patent No.: US 12,021,454 B2
(45) Date of Patent: Jun. 25, 2024

(54) CONTROL CIRCUIT FOR A MULTIPHASE BUCK CONVERTER, RELATED INTEGRATED CIRCUIT, MULTIPHASE BUCK CONVERTER AND METHOD OF OPERATING A MULTIPHASE BUCK CONVERTER

(71) Applicant: STMicroelectronics S.r.l., Agrate Brianza (IT)

(72) Inventors: Gerardo Castellano, Cusago (IT); Leonardo Pedone, Civitanova Marche (IT); Filippo Minnella, Orbassano (IT); Marcello Raimondi, Tortona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 151 days.

(21) Appl. No.: 17/730,878

(22) Filed: Apr. 27, 2022

(65) Prior Publication Data
US 2022/0360177 A1    Nov. 10, 2022

(30) Foreign Application Priority Data

May 7, 2021  (IT) .......................... 102021000011780

(51) Int. Cl.
*H02M 3/158* (2006.01)
*H02M 1/00* (2006.01)
*H02M 1/08* (2006.01)

(52) U.S. Cl.
CPC ....... *H02M 3/1586* (2021.05); *H02M 1/0009* (2021.05); *H02M 1/08* (2013.01); *H02M 1/0043* (2021.05)

(58) Field of Classification Search
CPC .. H02M 1/0009; H02M 1/0043; H02M 3/158; H02M 3/1584; H02M 3/1586; H02M 3/1588
See application file for complete search history.

(56) References Cited

U.S. PATENT DOCUMENTS 6,246,222 B1 *  6/2001  Nilles ................. H02M 3/1584
                                                 323/283
6,414,470 B1 *  7/2002  Liu ......................... H02J 1/102
                                                 323/272

(Continued)

OTHER PUBLICATIONS

STMicroelectronics, "Digital multi-phase constant-on-time regulator based on voltage controlled oscillator," TN1246 Technical note, DocID030464 Rev. 1, Mar. 2017, 14 pages.

(Continued)

*Primary Examiner* — Gary L Laxton
(74) *Attorney, Agent, or Firm* — Seed IP Law Group LLP

(57) ABSTRACT

A control circuit for a multiphase buck converter includes a regulator circuit and a plurality of phase control circuits. The regulator circuit generates a regulation signal based on a feedback signal and a reference signal, and each phase control circuit receives a current sense signal and generates a respective PWM signal based on the respective current sense signal and the regulation signal. The control circuit includes a first selector circuit and a second selector circuit configured to receive a selection signal and selectively connect each phase control circuit of a subset of the phase control circuits to a PWM signal for driving a respective stage of the multiphase buck converter, and to a current sense signal provided by the respective stage of the multiphase buck converter. A selection control circuit generates the selection signal in order to connect the phase control circuits to different stages of the multiphase buck converter.

20 Claims, 11 Drawing Sheets

(56) References Cited

U.S. PATENT DOCUMENTS

| | | | |
|---|---|---|---|
| 7,023,188 B1* | 4/2006 | Rice | H02M 3/1584 |
| | | | 323/282 |
| 8,159,197 B2* | 4/2012 | Cheng | H02M 3/1584 |
| | | | 323/242 |
| 8,610,412 B2 | 12/2013 | Teh et al. | |
| 2008/0150368 A1 | 6/2008 | Gurcan | |
| 2008/0303495 A1* | 12/2008 | Wei | H02M 7/003 |
| | | | 323/272 |
| 2019/0052165 A1 | 2/2019 | Zambetti | |
| 2021/0320590 A1* | 10/2021 | Ng | H02M 1/008 |

OTHER PUBLICATIONS

Wuidart, "Topologies for Switched Mode Power Supplies," STMicroelectronics Application Note, AN513/0393, 1999, 18 pages.

* cited by examiner

CONTROL CIRCUIT FOR A MULTIPHASE BUCK CONVERTER, RELATED INTEGRATED CIRCUIT, MULTIPHASE BUCK CONVERTER AND METHOD OF OPERATING A MULTIPHASE BUCK CONVERTER

BACKGROUND

Technical Field

The embodiments of the present disclosure refer to multi-phase buck converters.

Description of the Related Art

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck," "boost," "buck-boost," "Ćuk," "SEPIC," and "ZETA" type. Instead, isolated converters are, for instance, converters of the "flyback," "forward," "half-bridge," and "full-bridge" type. Such types of converters are well known to the person skilled in the art, as evidenced, e.g., by the application note AN513/0393 "Topologies for Switched Mode Power Supplies," L. Wuidart, 1999, STMicroelectronics.

BRIEF SUMMARY

Considering the foregoing, various embodiments of the present disclosure relate to improvements within multiphase buck converters.

According to one or more embodiments, one or more technical advantages or benefits are achieved by a control circuit for a multiphase buck converter having the features as described herein. Embodiments also regard a corresponding integrated circuit, multiphase buck converter and method of operating a multiphase buck converter.

As mentioned before, various embodiments of the present disclosure relate to a control circuit for a multiphase buck converter.

For example, as will be described in greater detail in the following, such a multiphase buck converter may comprise a first and a second input terminal configured to receive an input voltage, and a first and a second output terminal configured to provide the output voltage. In this case, one or more capacitors may be connected between the first and the second output terminals, and a feedback circuit generates a feedback signal indicative of the output voltage. Moreover, the multiphase buck converter comprises a plurality of stages. Specifically, in various embodiments, each stage comprises an inductance, wherein a first terminal of the inductance is connected to the first output terminal. Moreover, a first electronic switch and either a second electronic switch or a diode are connected between the first and the second input terminals and are configured to selectively connect a second terminal of the inductance to the first input terminal or the second input terminal. In various embodiments, a driver circuit of the stage is configured to receive a respective PWM signal and generate a respective first drive signal for the first electronic switch, and optionally a respective second drive signal for the second electronic switch (if provided). Moreover, a current sensor is configured to generate a respective current sense signal indicative of the current flowing through the respective inductance.

Accordingly, in various embodiments, the control circuit comprises a feedback terminal configured to receive the feedback signal indicative of the output voltage generated by the multi-phase buck converter. Similarly, the control circuit comprises a plurality of current-sense terminals, wherein each current-sense terminal is configured to receive from a respective stage of the multiphase buck converter a respective current sense signal indicative of the current flowing through the inductance of the respective stage. Finally, the control circuit comprises a plurality of control terminals, wherein the number of the control terminals corresponds to the number of the current-sense terminals, wherein each control terminal is configured to provide a respective PWM signal to the driver circuit of a respective stage of the multiphase buck converter. Thus, in general, each PWM signal is associated with a respective stage and thus with a respective current sense signal.

In various embodiments, the driver circuits may also be integrated in the control circuit, i.e., the control circuit may comprise a plurality of driver circuits, wherein the number of the driver circuits corresponds to the number of the control terminals, and wherein each driver circuit is configured to receive a respective PWM signal and generate a respective first drive signal for the first electronic switch of the respective stage, and optionally the respective second drive signal for the second electronic switch of the respective stage (if provided).

Accordingly, in various embodiments, the control circuit is configured to generate the PWM signals as a function of the feedback signal and the current sense signals.

For example, in various embodiments, the control circuit comprises a regulator circuit configured to generate a regulation signal by varying the regulation signal until the feedback signal corresponds to a reference signal. For example, the regulator circuit may be a (digital or analog) regulator comprising an integral component, and optionally a proportional and/or derivative component.

In this case, the control circuit comprises moreover a plurality of phase control circuits, wherein each phase control circuit is configured to receive a respective current sense signal and generate a respective PWM signal by varying the duty-cycle of the respective PWM signal as a function of the respective current sense signal and the regulation signal generated by the regulator circuit. For example, a phase control circuit may comprise a comparator configured to signal the end of a switch-on interval of the respective PWM signal when the instantaneous value of the respective current sense signal reaches the regulation signal during the switch-on interval, whereby the regulation signal represents a threshold value for the instantaneous current. Alternatively, a phase control circuit may comprise a further regulator having an integral component and/or a proportional component, and configured to vary the duty-cycle of the respective PWM signal as a function of the difference between the average value during the switch-on interval of the respective current sense signal and the regulation signal, whereby the regulation signal represents a reference value for the average current.

Specifically, in various embodiments, the control circuit comprises moreover a first selector circuit and a second selector circuit configured to receive a selection signal and, in response to the selection signal, selectively connect each phase control circuit of a subset of a given number of phase control circuits, via a respective second PWM signal, to one of the PWM signals and, via a respective second current sense signal, to the current sense signal associated with the PWM signal connected to the phase control circuit, i.e., the current sense signal associated with the PWM signal connected to the respective second PWM signal. For example, the first selector circuit may comprise a plurality of electronic switches for connecting each second current sense signal to each current sense signal, and the second selector circuit may comprise a plurality of electronic switches for connecting each second PWM signal to each PWM signal.

In various embodiments, a selection control circuit may thus be configured to generate the selection signal. Specifically, in a first switching mode, the selection control circuit may set the selection signal in order to connect the given number of phase control circuits to a first set of PWM signals and associated current sense signals. Conversely, in a second switching mode, the selection control circuit may set the selection signal in order to connect the given number of phase control circuits to a second set of PWM signals and associated current sense signals, wherein the second set is at least in part different from the first set.

For example, the number of phase control circuits in the subset may correspond to the number of activated phase control circuits. For example, for this purpose, the regulator circuit may be configured to determine, as a function of the regulation signal, a number of phase control circuits to be activated, and activate the corresponding number of phase control circuits.

In general, the number of phase control circuits may thus correspond to or may be smaller than the number of stages of the multiphase buck converter (as indicated, e.g., by the number of the current-sense terminals).

Generally, the selection control circuit may use different solutions for selecting the subset of stages to be connected to the phase control circuits.

For example, in various embodiments, the control circuit comprises a communication interface, and the selection control circuit is configured to activate the first switching mode or the second switching mode as a function of a control signal received via the communication interface. In this case, the selection control circuit may be configured to select the stages belonging to the first subset of stages (i.e., the respective first set of PWM signals and associated current sense signals) and/or the second subset of stages (i.e., the respective second set of PWM signals and associated current sense signals) as a function of the control signal received via the communication interface.

Additionally or alternatively, the selection control circuit may be configured to activate the first switching mode and monitor the respective first subset of current sense signals of the respective stages connected to the phase control circuits. Next, the selection control circuit may determine whether a monitored current sense signal is greater than an upper threshold (e.g., indicative of a short-circuit condition) and/or smaller than a lower threshold (e.g., indicative of an open-load condition), and possibly activate the second switching mode, wherein the second set of stages (i.e., the respective set of current sense signals and PWM signals) does not comprise anymore the monitored stage/current sense signal.

Additionally or alternatively, the selection control circuit may be configured to periodically activate the first switching mode and the second switching mode.

BRIEF DESCRIPTION OF THE SEVERAL VIEWS OF THE DRAWINGS

The embodiments of the present description will now be described with reference to the annexed drawings, which are provided purely by way of non-limiting example, and in which.

DETAILED DESCRIPTION

In the ensuing description various specific details are illustrated aimed at enabling an in-depth understanding of the embodiments. The embodiments may be provided without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description, do not necessarily refer to one and the same embodiment. Moreover, particular conformations, structures, or characteristics may be combined in any adequate way in one or more embodiments.

The references used herein are merely provided for convenience and hence do not define the sphere of protection or the scope of the embodiments.

Figure 1:
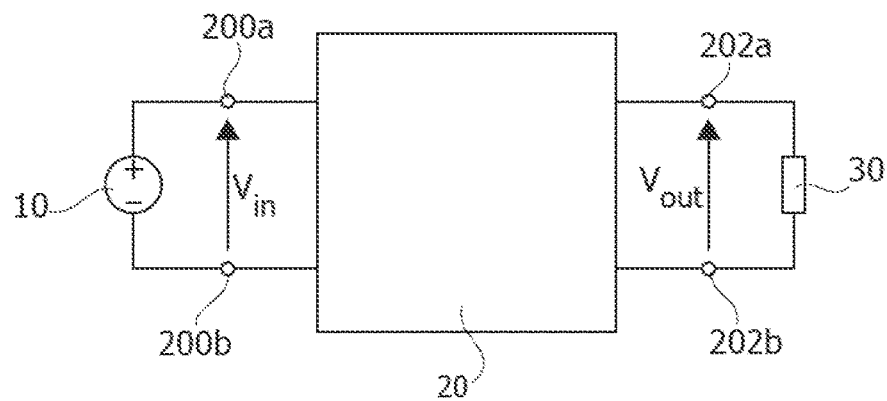
FIG. 1 is a schematic diagram illustrating an electronic converter, in accordance with some embodiments.

FIG. 1 is a schematic illustration of a DC/DC electronic converter 20. In particular, a generic electronic converter 20 comprises two input terminals 200a and 200b for receiving a DC voltage $V_{in}$ and two output terminals 202a and 202b for supplying a DC voltage $V_{out}$. For example, the input voltage $V_{in}$ may be supplied by a DC voltage source 10, such as a battery, or may be obtained from an AC voltage by means of a rectifier circuit, such as a bridge rectifier, and possibly a filtering circuit. Instead, the output voltage $V_{out}$ may be used to supply a load 30.

Figure 2:
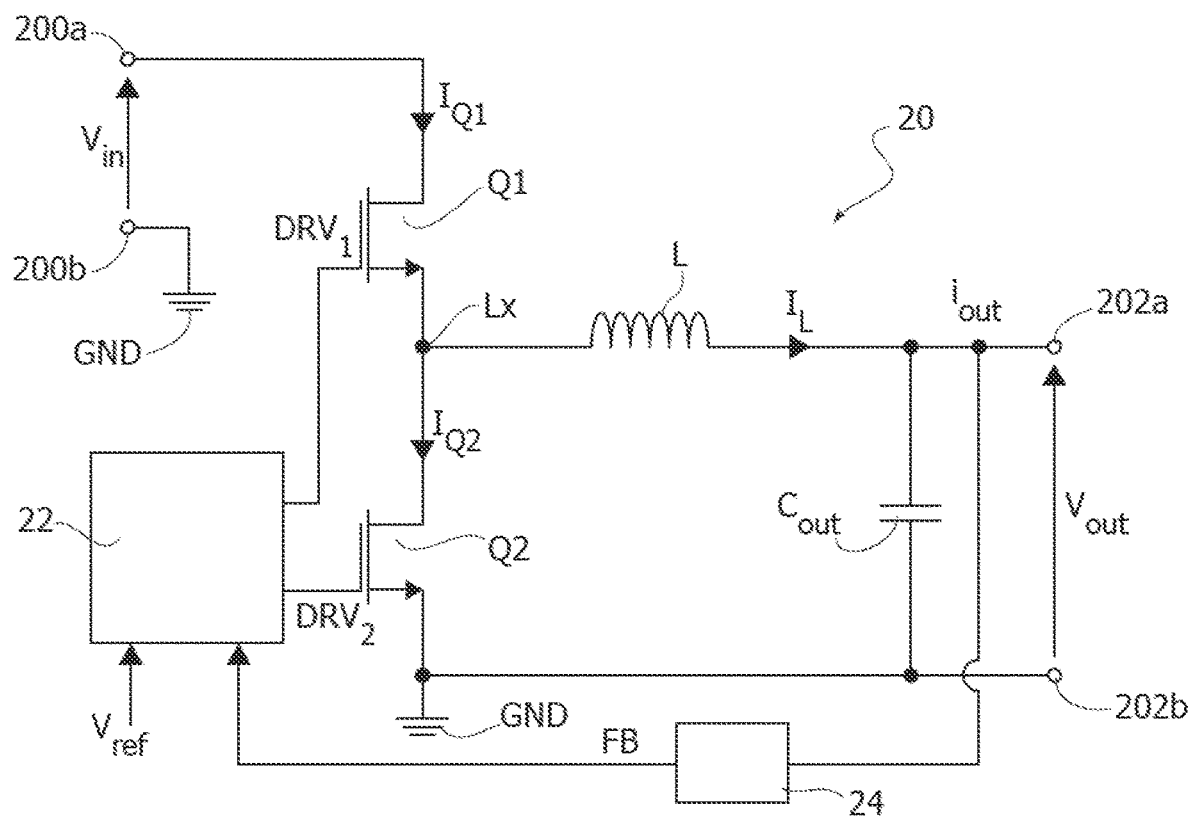
FIG. 2 is a schematic diagram illustrating a buck converter, in accordance with a comparative example.

FIG. 2 shows the circuit schematic of an example of a buck converter 20. In particular, a buck converter 20 comprises two input terminals 200a and 200b for receiving a DC input voltage $V_{in}$ and two output terminals 202a and 202b for supplying a regulated voltage $V_{out}$, where the output voltage is equal to or lower than the input voltage $V_{in}$.

In the example considered, the buck converter 20 comprises two electronic switches Q1 and Q2 (with the current path thereof) connected (e.g., directly) in series between the input terminals 200a and 200b, wherein the intermediate node between the electronic switches Q1 and Q2 represents a switching node Lx. Specifically, the electronic switch Q1 is a high-side switch connected (e.g., directly) between the (positive) terminal 200a and the switching node Lx, and the electronic switch Q2 is a low-side switch connected (e.g., directly) between the switching node Lx and the (negative) terminal 200b, which often represents a ground GND. The (high-side) switch Q1 and the (low-side) switch Q2 hence represent a half-bridge configured to connect the switching node Lx to the terminal 200a (voltage $V_{in}$) or the terminal 200b (ground GND).

In the example considered, an inductance L, such as an inductor, is connected (e.g., directly) between the switching node Lx and the (positive) output terminal 202a. Instead, the (negative) output terminal 202b is connected (e.g., directly) to the (negative) input terminal 200b.

In the example considered, to stabilize the output voltage $V_{out}$, the converter 20 typically comprises a capacitor $C_{out}$ connected (e.g., directly) between the output terminals 202a and 202b.

Figure 3:
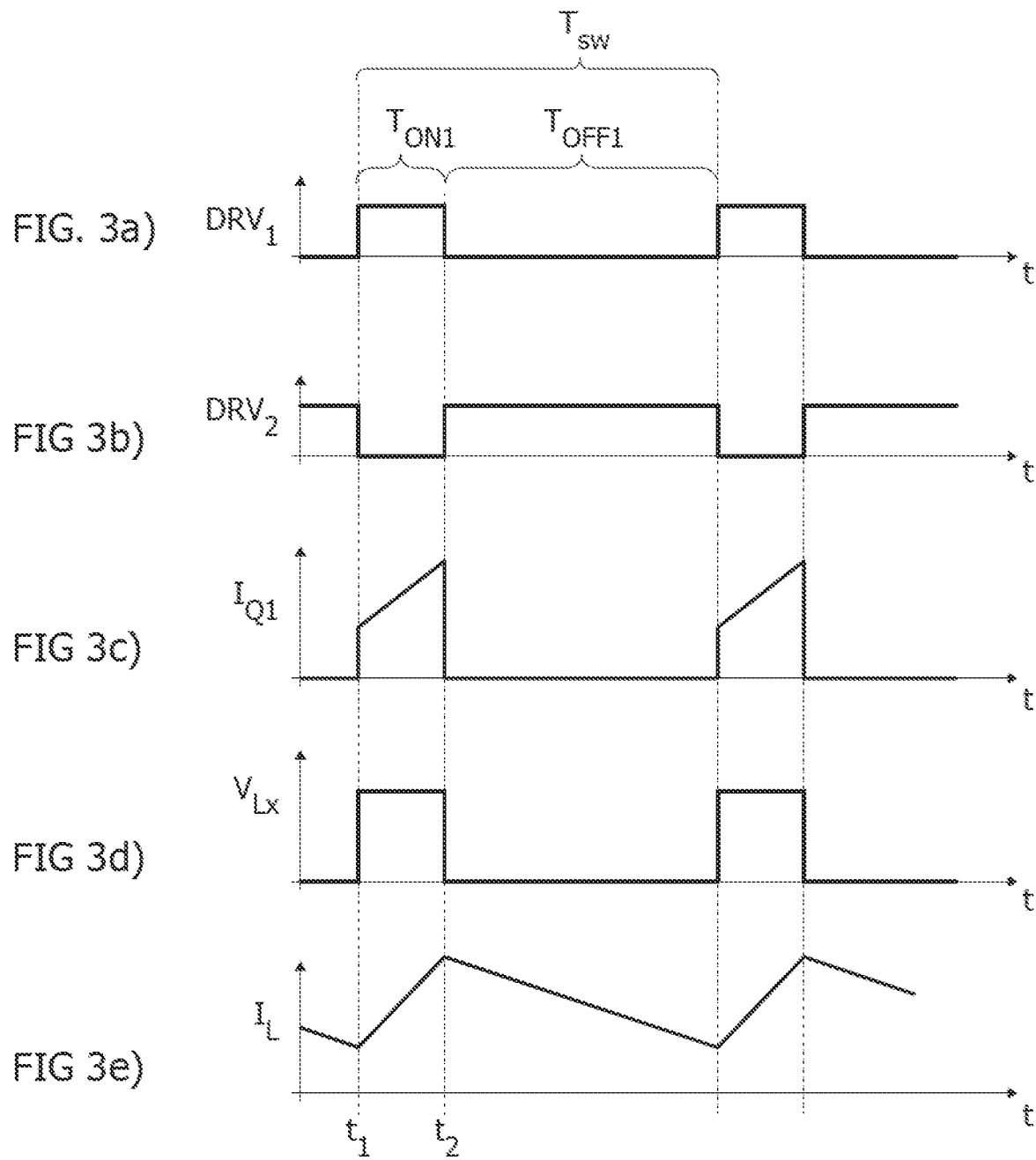
FIG. 3a to 3e are waveform diagrams showing waveforms of the buck converter of FIG. 2.

In this context, FIG. 3 shows exemplary waveforms of the signals of such an electronic converter, where:

FIG. 3a shows the signal $DRV_1$ for switching the electronic switch Q1;

FIG. 3b shows the signal $DRV_2$ for switching the second electronic switch Q2;

FIG. 3c shows the current $I_{Q1}$ that traverses the electronic switch Q1;

FIG. 3d shows the voltage $V_{Lx}$ at the switching node Lx (i.e., the voltage at the second switch Q2); and FIG. 3e shows the current $I_L$ that traverses the inductor L.

In particular, when the electronic switch Q1 is closed at an instant $t_1$ (ON state), the current $I_L$ in the inductor L increases (substantially) linearly. The electronic switch Q2 is at the same time opened. Instead, when the electronic switch Q1 is opened after an interval $T_{ON1}$ at an instant $t_2$ (OFF state), the electronic switch Q2 is closed, and the current $I_L$ decreases (substantially) linearly. Finally, the switch Q1 is closed again after an interval $T_{OFF1}$. In the example considered, the switch Q2 is hence closed when the switch Q1 is open, and vice versa. The current $I_L$ may thus be used to charge the capacitor $C_{out}$, which supplies the voltage $V_{out}$ at the terminals 202a and 202b.

In the example considered, the electronic converter 20 comprises thus a control circuit 22 configured to drive the switching of the switch Q1 and of the switch Q2, for repeating the intervals $T_{ON1}$ and $T_{OFF1}$ periodically. For example, typically the buck converter 20 comprises also a feedback circuit 24, such as a voltage divider, configured to generate a feedback signal FB indicative of (and preferably proportional to) the output voltage $V_{out}$ and the control circuit 22 is configured to generate the drive signals $DRV_1$ and $DRV_2$ by comparing the feedback signal FB with a reference signal, such as a reference voltage $V_{ref}$.

A significant number of driving schemes are known for generating the drive signals $DRV_1$ and $DRV_2$. These solutions have in common the possibility of regulating the output voltage $V_{out}$ by regulating the duration of the interval $T_{ON1}$ and/or the interval $T_{OFF1}$.

For example, in various solutions, the control circuit 22 generates a Pulse-Width Modulation (PWM) signal $DRV_1$, wherein the duty-cycle $T_{ON1}/(T_{ON1}+T_{OFF1})$ is variable. Generally, the switching period $T_{SW}=T_{ON1}+T_{OFF1}$ may be constant or variable. For example, a typical control scheme involves that the switching period $T_{SW}$ is constant and the duration of the interval $T_{ON1}$ is varied via a regulator circuit having at least an integral component, such as a PI (Proportional-Integral) or PID (Proportional-Integral-Derivative) regulator.

In general, a buck converter may be operated in a Continuous-Conduction Mode (CCM), Discontinuous-Conduction Mode (DCM) or Transition Mode (TM).

Figure 4:
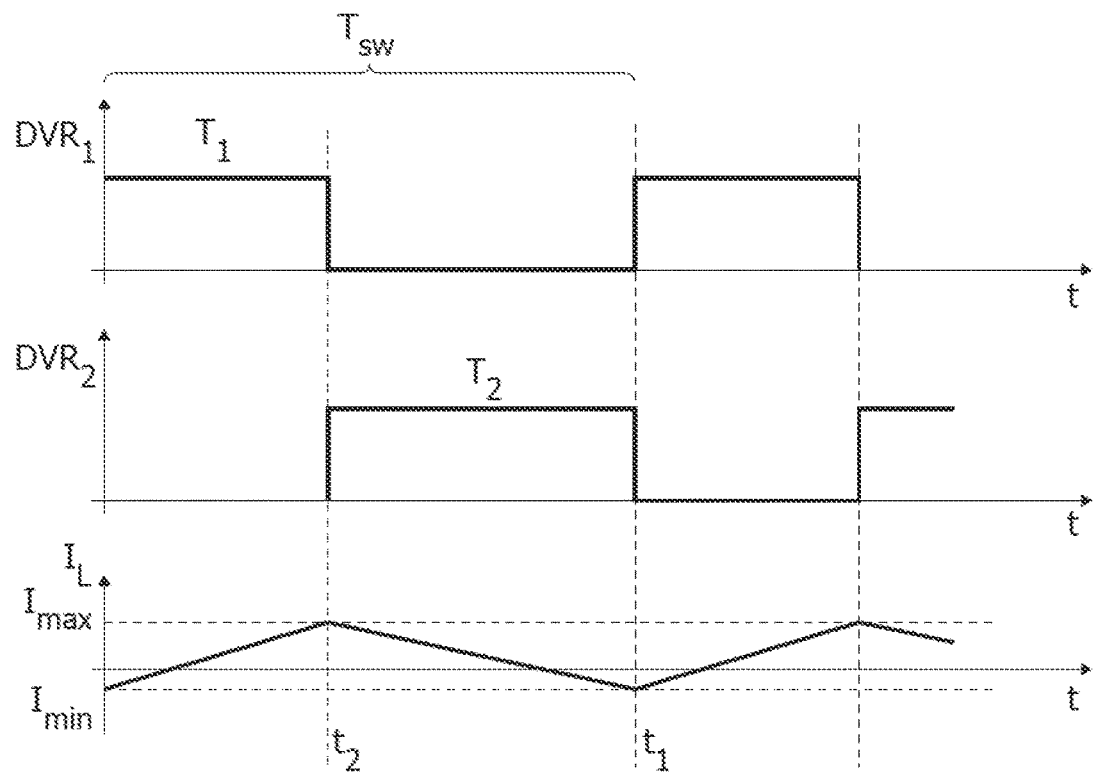
FIG. 4 is a waveform diagram showing example waveforms when the buck converter is operated in CCM.

For example, as shown in FIG. 4, when the control circuit 22 operates the converter in CCM, the current $I_L$ flowing through the inductance L has a value different from zero when the switching cycle $T_{SW}$ ends. In this case, the control circuit 22 uses two switching phases $T_1$ and $T_2$, with $T_{SW}=T_1+T_2$, wherein:

during the phase $T_1$ ($T_1=T_{ON1}=T_{OFF2}$) the switch Q1 is closed and the switch/diode Q2 is opened; and during the phase $T_2$ ($T_2=T_{OFF1}=T_{ON2}$) the switch Q1 is opened and the switch/diode Q2 is closed.

Figure 5:
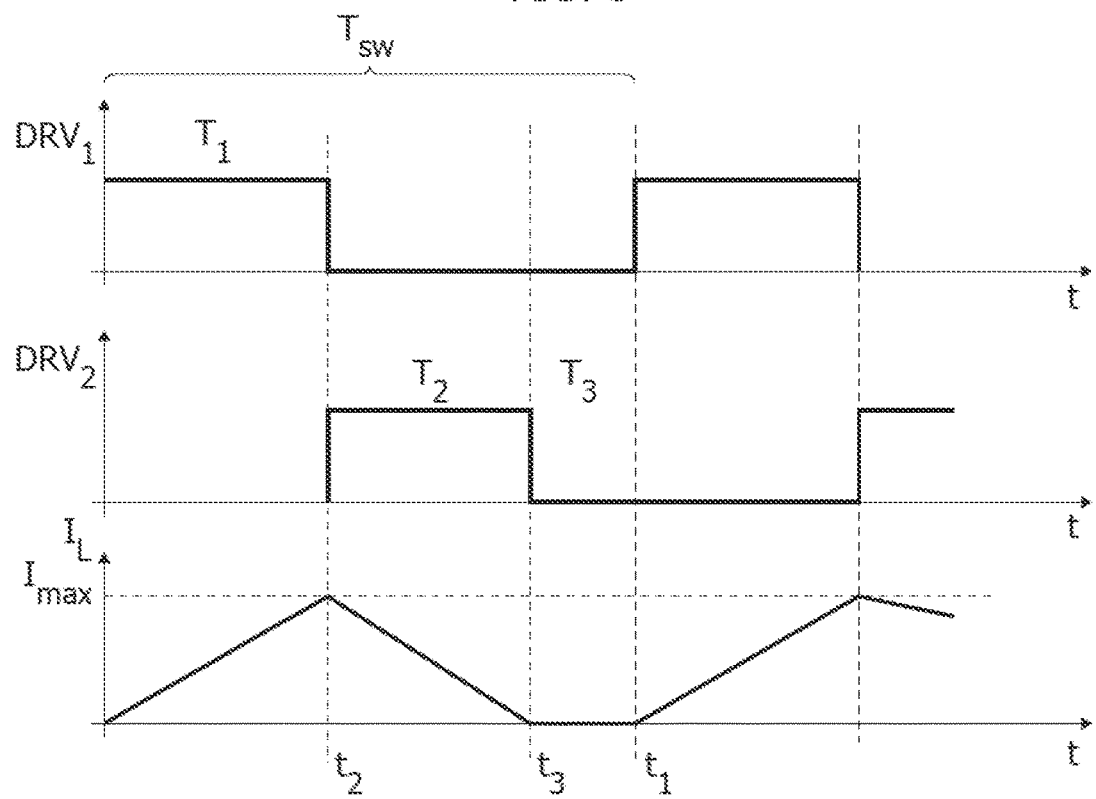
FIG. 5 is a waveform diagram showing example waveforms when the buck converter is operated in DCM.

Conversely, as shown in FIG. 5, in DCM, the control circuit 22 may use three switching phases $T_1$, $T_2$ and $T_3$, with $T_{SW}=T_1+T_2+T_3$, wherein:

during the phase $T_1$ ($T_1=T_{ON1}$) the switch Q1 is closed and the switch/diode Q2 is opened;

during the phase $T_2$ ($T_2=T_{ON2}$) the switch Q1 is opened and the switch/diode Q2 is closed; and during the phase $T_3$ ($T_{OFF1}=T_2+T_3$ and $T_{OFF2}=T_3+T_1$) the switch Q1 is opened and the switch/diode Q2 is opened.

Specifically, in DCM, the electronic switch Q2 is opened (and remains opened during the interval $T_3$) when the current $I_L$ reaches zero.

In various solutions, also (usually fixed) dead times may be introduced between the switching of the drive signals, e.g., between the falling edge of the signal $DRV_1$ and the rising edge of the signal $DRV_2$, and similarly (in CCM mode) between the falling edge of the signal $DRV_2$ and the rising edge of the signal $DRV_1$. Insofar as these intervals are usually short compared to the durations $T_{ON}$ and $T_{OFF}$, these intervals will not be considered specifically in the following.

For higher current flows, the buck converter may also be used as in a multiphase configuration, so called multiphase buck converters. Specifically, in this case a plurality of buck converters are used to charge the same output capacitor $C_{out}$, wherein each buck converter represents a phase of the multiphase buck converters.

In FIGS. 6 to 18, parts, elements, or components that have already been described with reference to FIGS. 1 to 5 are designated by the same references used previously in these figures; the description of these elements described previously will not be repeated hereinafter in order not to overburden the present detailed description.

As mentioned before, various embodiments of the present disclosure relate to a control circuit for a multiphase buck converter.

Figure 6:
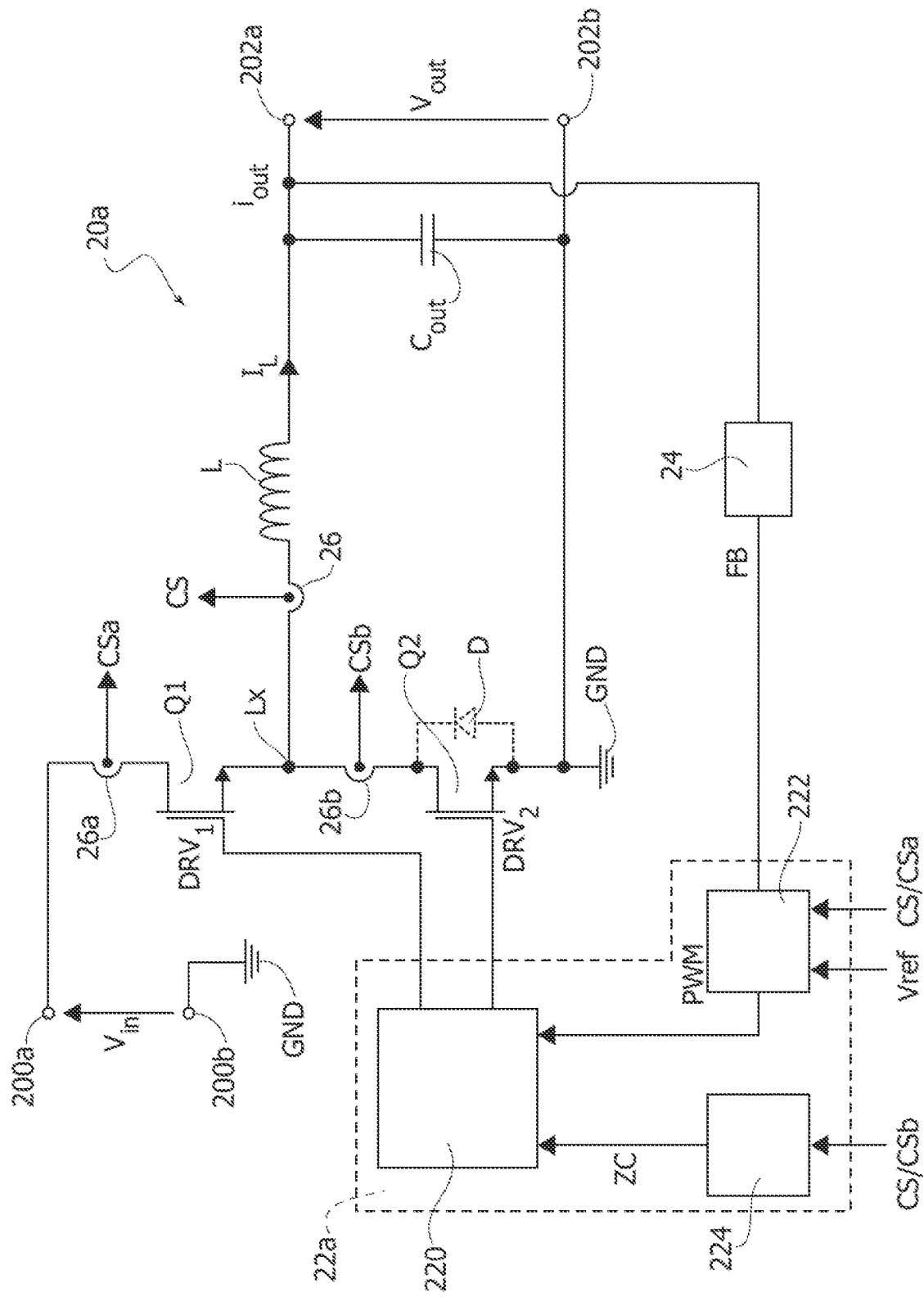
FIG. 6 is a schematic diagram illustrating a control circuit for a single-stage buck converter, in accordance with one or more embodiments.

FIG. 6 shows in this respect an embodiment of a control circuit for a single-stage buck converter 20a.

As described with respect to FIG. 2, such a buck converter 20a comprises two input terminals 200a and 200b for receiving a DC input voltage $V_{in}$ and two output terminals 202a and 202b for supplying a regulated voltage $V_{out}$.

In the embodiment considered, the buck converter 20a comprises two electronic switches Q1 and Q2 (with the current path thereof) connected (e.g., directly) in series between the input terminals 200a and 200b, wherein the intermediate node between the electronic switches Q1 and Q2 represents a switching node Lx. Specifically, the electronic switch Q1 is a high-side switch connected (e.g., directly) between the (positive) terminal 200a and the switching node Lx, and the electronic switch Q2 is a low-side switch connected (e.g., directly) between the switching node Lx and the (negative) terminal 200b, which often represents a ground GND. In various embodiments, the switches Q1 and/or Q2 are transistors, such as Field-Effect Transistors (FETs), such as Metal-Oxide-Semiconductor Field-Effect Transistors (MOSFETs), e.g., n-channel FET, such as NMOS. In various embodiments, the second electronic switch Q2 may be implemented with a diode D, where the anode is connected to the terminal 200b and the cathode is connected to the switching node Lx.

In the embodiment considered, an inductance L, such as an inductor, is connected (e.g., directly) between the switching node Lx and the (positive) output terminal 202a. Instead, the (negative) output terminal 202b is connected (e.g., directly) to the (negative) input terminal 200b.

In the embodiment considered, the converter 20a typically comprises a capacitor $C_{out}$ connected (e.g., directly) between the output terminals 202a and 202b.

Specifically, in FIG. 6, the buck converter 20a comprises also:
  a feedback circuit 24 configured to generate a feedback signal FB indicative of (and preferably proportional to) the output voltage $V_{out}$; and
  a control circuit 22a configured to generate the drive signal $DRV_1$ for the electronic switch Q1 and optionally the drive signal $DRV_2$ for the electronic switch Q2 (in case the electronic switch Q1 is not replaced with a diode) as a function of the feedback signal FB and a reference signal $V_{ref}$ indicative of (and preferably proportional to) a requested value for the output voltage $V_{out}$.

Specifically, in FIG. 6, the control circuit 22a comprises:
a PWM signal generator circuit 222 configured to generate a Pulse-Width Modulated (PWM) signal PWM as a function of the feedback signal FB and the reference signal $V_{ref}$; and
a driver circuit 220 configured to generate the drive signal $DRV_1$ for the electronic switch Q1 and optionally the drive signal $DRV_2$ for the electronic switch Q2 as a function of the PWM signal PWM.

Figure 7:
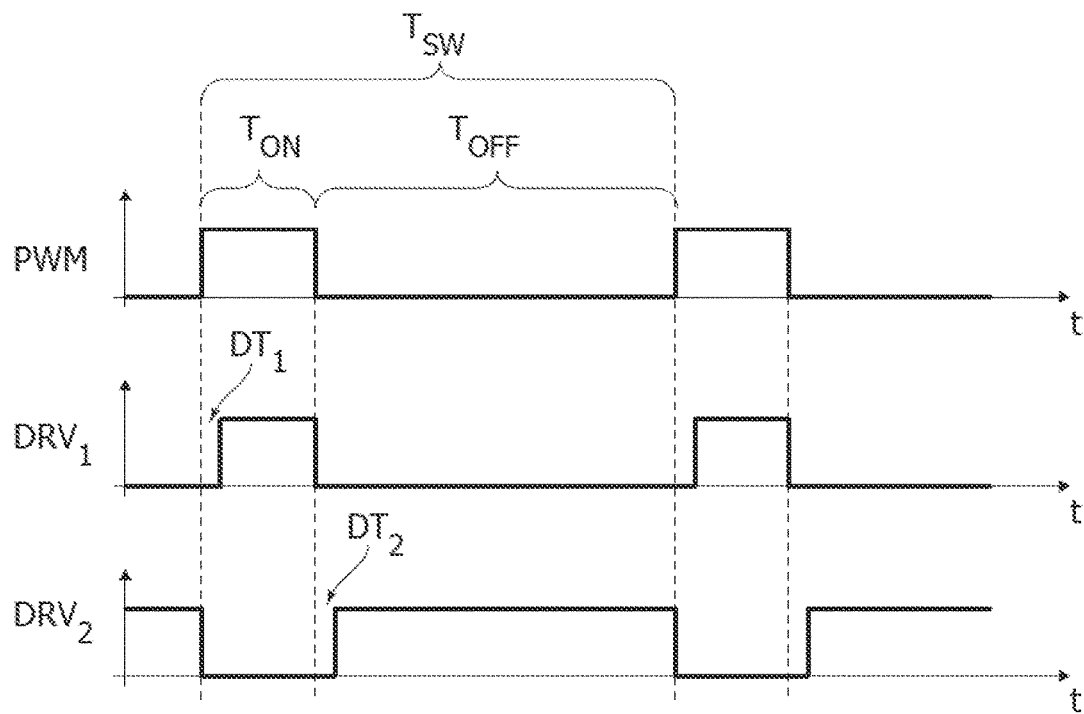
FIG. 7 is a waveform diagram illustrating generation of the drive signals for the electronic switches of a buck converter as a function of a PWM signal, in accordance with one or more embodiments.

Generally, as shown in FIG. 7, the PWM signal PWM comprises a switch-on period $T_{ON}$ where the signal is set to high and a switch-off period $T_{OFF}$ where the signal is set to high. Generally, the switching period $T_{SW}=T_{ON}+T_{OFF}$, may be constant or variable.

Figure 8:
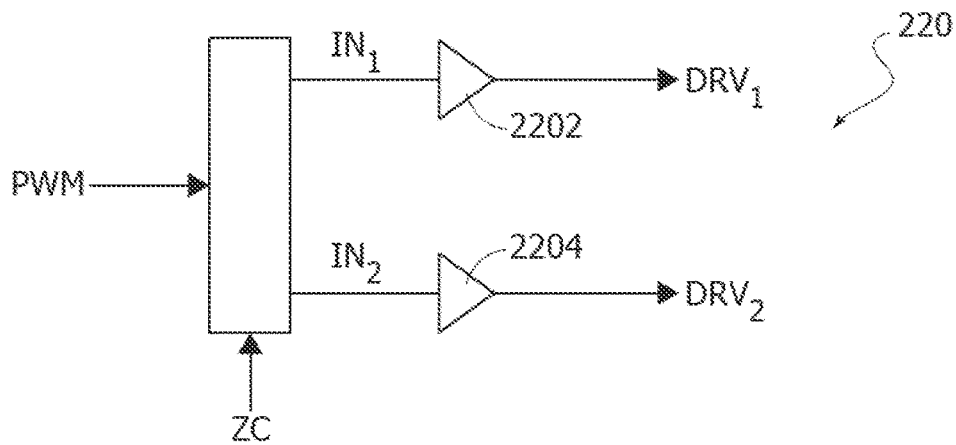
FIG. 8 is a schematic diagram illustrating a driver circuit configured to generate the drive signals for the electronic switches of a buck converter as a function of a PWM signal, in accordance with one or more embodiments.

FIG. 8 shows a possible embodiment of the driver circuit 220.

Specifically, in case the buck-converter 20a comprises the electronic switch Q1 and a diode D, the driver circuit 220 may comprise a high-side driver circuit 2202 configured to generate the drive signal $DRV_1$ as a function of the PWM signal PWM. Specifically, in this case, the high-side driver circuit 2202 may receive at input a signal $IN_1$, which corresponds to the signal PWM, i.e., the logic level of the drive signal $DRV_1$ corresponds to the logic level of the PWM signal PWM, but the signal levels change in order to correctly drive the high side switch Q1, possibly also implementing a slew-rate control.

Conversely, in case the buck-converter 20a comprises the electronic switch Q1 and the electronic switch Q2, the driver circuit 220 may comprise:
  a high-side driver circuit 2202 configured to generate the drive signal $DRV_1$ as a function of a signal $IN_1$;
  a low-side driver circuit 2204 configured to generate the drive signal $DRV_2$ as a function of a signal $IN_2$; and
  a driver control circuit 2200 configured to generate the signals $IN_1$ and $IN_2$ for the high-side driver circuit 2202 and low-side driver circuit 2204 as a function of the PWM signal PWM.

Specifically, as shown in FIG. 7, the driver control circuit 2220 may be configured to monitor the rising and falling edged of the PWM signal PWM and:
  in response to detecting a rising edge, set the signal $IN_2/DRV_2$ (e.g., immediately) to low and set the signal $IN_1/DRV_1$ (immediately or preferably after a dead-time $DT_1$) to high; and
  in response to detecting a falling edge, set the signal $IN_1/DRV_1$ (e.g., immediately) to low and set the signal $IN_2/DRV_2$ (immediately or preferably after a dead-time $DT_2$) to high.

As mentioned before, this driving scheme may be used when the buck-converter 20a is driven in CCM. Conversely, in DCM, the electronic switch Q2 (when used) should be opened when the current flowing through the inductance L reaches zero during the switch-off period $T_{OFF}$. For example, for this purpose, the driver circuit 220 may also receive a so called zero current signal ZC indicating whether the current $I_L$ flowing through the inductance L reaches zero (at least during the interval $T_{OFF}$). Accordingly, in this case, the driver control circuit 2220 may be configured to monitor the rising and falling edged of the PWM signal PWM and the zero-current signal ZC, and:
  in response to detecting a rising edge, set the signal $IN_1/DRV_1$ (e.g., immediately) to high; and
  in response to detecting a falling edge, set the signal $IN_1/DRV_1$ (e.g., immediately) to low and set the signal $IN_2/DRV_2$ (immediately or preferably after a dead-time $DT_2$) to high; and
  in response to detecting that the zero-current signal ZC indicates that the current flowing through the inductance L reaches zero during the switch-off period $T_{OFF}$, set the signal $IN_2/DRV_2$ (e.g., immediately) to low.

For example, as shown in FIG. 6, the zero-current signal ZC may be provided by a zero current detection circuit 224. For example, the zero current detection circuit 224 may be implemented with a comparator, so called zero-current comparator, receiving at input a signal indicative of the current $I_L$ flowing through the inductance L during the switch-off period $T_{OFF}$. Specifically, the zero-current comparator may be configured to determine whether the monitored signal falls below a given threshold (which is usually close to zero).

For example, as shown in FIG. 6, the buck converter 20a may comprise a current sensor 26 connected directly in series with the inductance L, wherein the current sensor 26 provides a signal CS indicative of (and preferably proportional to) the current $I_L$ flowing through the inductance L.

Alternatively, the current $I_L$ flowing through the inductance L during the switch-off period $T_{OFF}$ may be monitored via a current sensor 26b connected directly in series with the electronic switch Q2, wherein the current sensor 26b provides a signal CSb indicative of (and preferably proportional to) the current flowing through the switch Q2, which corresponds to the current $I_L$ flowing through the inductance L during the interval $T_{OFF}$.

Accordingly, the zero-current comparator 224 may receive the signal CS or CSb.

In order to generate the PWM signal PWM, the PWM generator circuit 222 may use various solutions. Generally, these solutions have in common that, irrespective of whether CCM or DCM is used, the energy transfer may be regulated by varying the duty-cycle of the PWM signal DRV.

For example, in a first embodiment, the PWM generator circuit 222 is configured to directly vary the duty-cycle of the PWM signal PWM, e.g.:
increase the duty-cycle of the PWM signal PWM when the feedback signal FB is smaller than the reference signal $V_{ref}$, and
decrease the duty-cycle of the PWM signal PWM when the feedback signal FB is greater than the reference signal $V_{ref}$.

For example, for this purpose, the PWM generator circuit comprise a regulator having at least an integral component I, such as a PI o PID regulator, configured to vary the duty-cycle of the PWM signal PWM as a function of the error, i.e., the difference, between the signals FB a $V_{ref}$. Generally, the PWM generator circuit may vary the duty-cycle of the signal PWM by:
using a constant switching period $T_{SW}$, and varying the switch-on period $T_{ON}$;
using a constant switch-on period $T_{ON}$, and varying the switching period $T_{SW}$; or
varying both the switching period $T_{SW}$ and the switch-on period $T_{ON}$.

Conversely, as will be described in greater detail in the following, in a multi-phase buck converter, it is preferable to generate the PWM signal PWM rather based on the current flowing through the inductance L. For example, in this way may be balanced the current flows in the various stages.

Accordingly, in a second solution, the PWM generator circuit 222 may be configured to monitor a signal indicative of the average value of the current $I_L$ flowing through the inductance L during the switch-on period $T_{ON}$. For example, this is shown in FIG. 6, where the PWM generator circuit 222 receives the signal CS provided by the sensor 26.

Alternatively, the current $I_L$ flowing through the inductance L during the switch-on period $T_{ON}$ may be monitored via a current sensor 26a connected directly in series with the electronic switch Q1, wherein the current sensor 26a provides a signal CSa indicative of (and preferably proportional to) the current flowing through the switch Q1, which corresponds to the current $I_L$ flowing through the inductance L during the interval $T_{ON}$.

Figure 9:
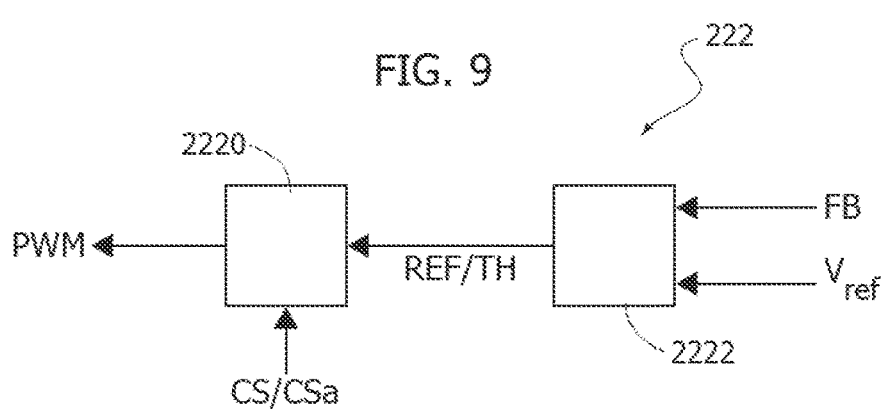
FIG. 9 is a schematic diagram illustrating a regulator circuit configured to generate a PWM signal as a function of a feedback signal of the buck converter, in accordance with one or more embodiments.

Specifically, as shown in FIG. 9, in this case, the PWM generator circuit 222 may comprise:
a first regulator 2220 (inner loop) having at least an integral component I and/or a proportional component P, such as a PI o PID regulator, configured to vary the duty-cycle of the PWM signal PWM as a function of a first error, in particular the difference between the average value of the current $I_L$ flowing through the inductance L during the interval $T_{ON}$ and a reference value REF; and
a second regulator 2222 (outer loop) having at least an integral component I, such as a PI o PID regulator, configured to vary the reference value REF as a function of a second error, in particular the difference between the feedback signal FB and the reference signal $V_{ref}$.

Alternatively, the PWM generator circuit 222 may be configured to monitor a signal indicative of the instantaneous value of the current $I_L$ flowing through the inductance L during the switch-on period $T_{ON}$. For example, for this purpose may be used the current sensor 26 or the current sensor 26a.

Specifically, in this case, the PWM generator circuit 222 may comprise:
a comparator 2220 configured to signal the end of the switch-on interval $T_{ON}$ when the instantaneous value of the current $I_L$ flowing through the inductance L during the interval $T_{ON}$ reaches a threshold value TH; and
a regulator 2222 having at least an integral component I, such as a PI o PID regulator, configured to vary the threshold value TH as a function of an error, in particular the difference, between the feedback signal FB and the reference signal $V_{ref}$.

Thus, in various embodiments, the regulation of the buck converter 20a may also take into account the instantaneous and/or average value of the current $I_L$ during the interval $T_{ON}$ and/or $T_{OFF}$.

For example, the current sensors shown in FIG. 6 may be implemented with a shunt resistor, where the voltage across the shunt resistor is proportional to the current that traverses the resistor. Alternatively, it is possible to use (for the sensor 26) the DC resistance (DCR) of the inductance L or (for the sensors 26a/26b) the resistance of the switch Q1/Q2, for example the on-state resistance $R_{DS,on}$ (resistance between the drain and source terminals in the ON state), e.g., of a respective MOSFET. Other possible embodiments of current sensors adapted to be used to monitor instantaneous and/or average current flows in a buck converter are, e.g., disclose in Italian patent application n. 102020000028832, which is incorporated herein by reference.

Figure 10:
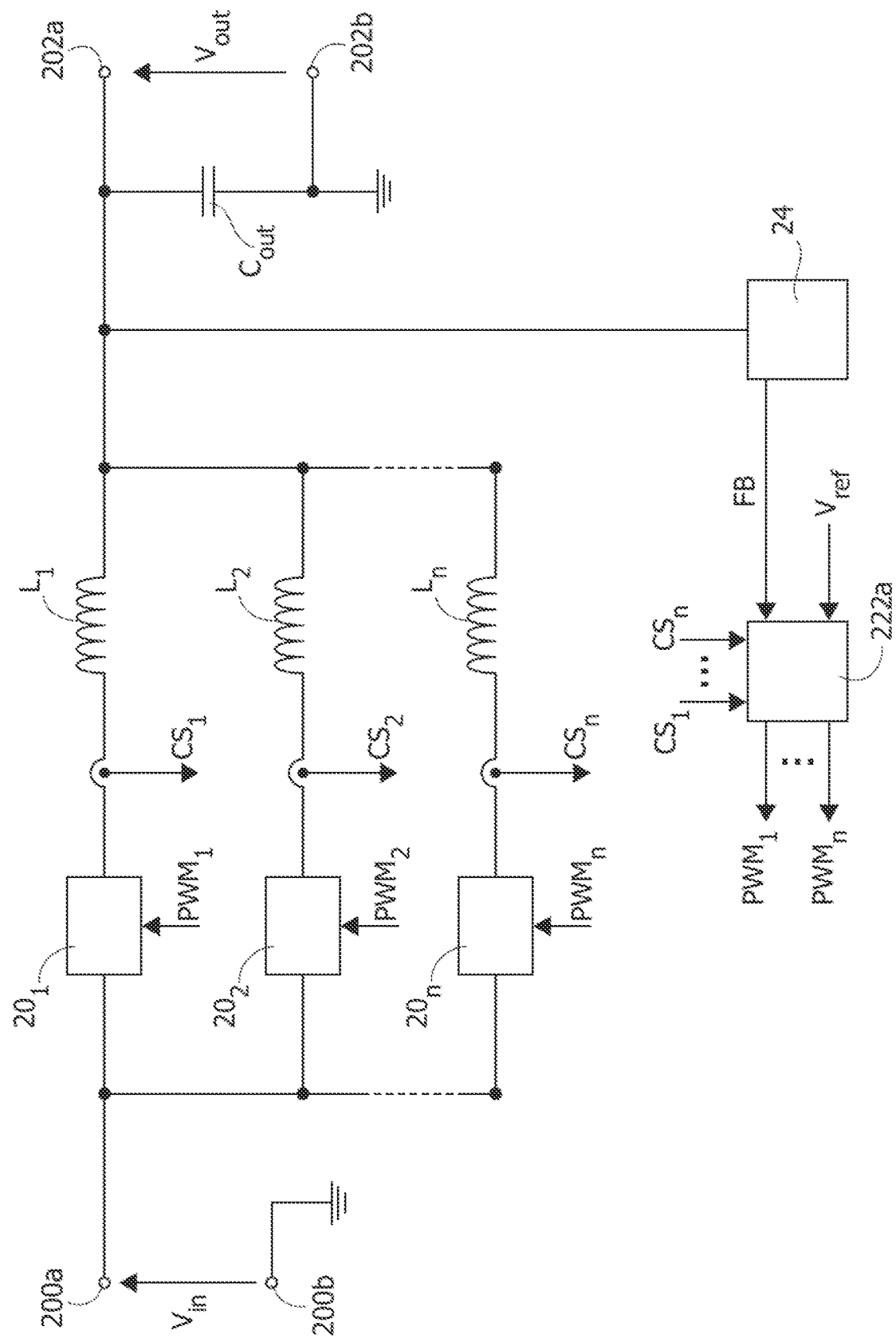
FIG. 10 is a schematic diagram illustrating a multi-phase buck converter, in accordance with one or more embodiments.

FIG. 10 shows an embodiment of a multiphase buck converter that comprises n phases/stages $20_1, \ldots, 20_n$.

Substantially, each phase has the structure illustrated in FIG. 6, with the only difference that all the stages charge the same capacitor $C_{out}$ (or a plurality of capacitors connected in parallel). Consequently, each stage $20_1, \ldots, 20_n$ comprises a respective switch Q1 and a respective switch Q2/diode D, where the switching node Lx is connected via a respective inductor $L_1, \ldots, L_n$ to the terminal 202a, where the switch Q1 and optionally the switch Q2 are driven by means of a respective driver circuit 220 configured to generate the drive signal $DRV_1$ and optionally the drive signal $DRV_2$ as a function of a respective PWM modulated signal $PWM_1, \ldots, PWM_n$, and optionally a zero current signal ZC.

In the embodiment considered, a PWM generator circuit 222a may thus vary the duty-cycles of the PWM modulated signals $PWM_1, \ldots, PWM_n$ provided to the stages $20_1, \ldots, 20_n$ in such a way that the signal FB provided by the feedback circuit 24 corresponds to the threshold $V_{ref}$. In various embodiments, the PWM generator circuit 222 may also monitor for each stage $20_1, \ldots, 20_n$ a signal indicative of the current $CS_1, \ldots, CS_n$ flowing through the respective inductance $L_1, \ldots, L_n$, such as the signal CS provided by the sensor 26 or the signal CSa provided by the sensor 26a.

Thus, essentially, each stage $20_1, \ldots, 20_n$ comprises:
an electronic switch Q1, and an electronic switch Q2 or diode D;
a respective inductance $L_1, \ldots, L_n$;
a current sensor providing a respective signal $CS_1, \ldots, CS_n$ indicative of (and preferably proportional to) the (instantaneous or average value of the) current $I_L$ flowing through the respective inductance $L_1, \ldots, L_n$;
a driver circuit 220 configured to generate the drive signal $DRV_1$ for the electronic switch Q1 and optionally the drive signal $DRV_2$ for the electronic switch Q2 as a function of a PWM modulated signal; and
optionally, in in case the stage comprises also the electronic switch Q2 and may be operated in DCM, a respective zero-current detection circuit 224.

Conversely, the following circuits are common for the multiphase buck converter:
the output capacitor(s) $C_{out}$;
the feedback circuit 24; and
the PWM generator circuit 222a configured to generate the PWM modulated signals $PWM_1, \ldots, PWM_n$ as a function of the feedback signal FB, the reference signal $V_{ref}$ and the signals $CS_1, \ldots, CS_n$ provide by the stages $20_1, \ldots, 20_n$.

Figure 11:
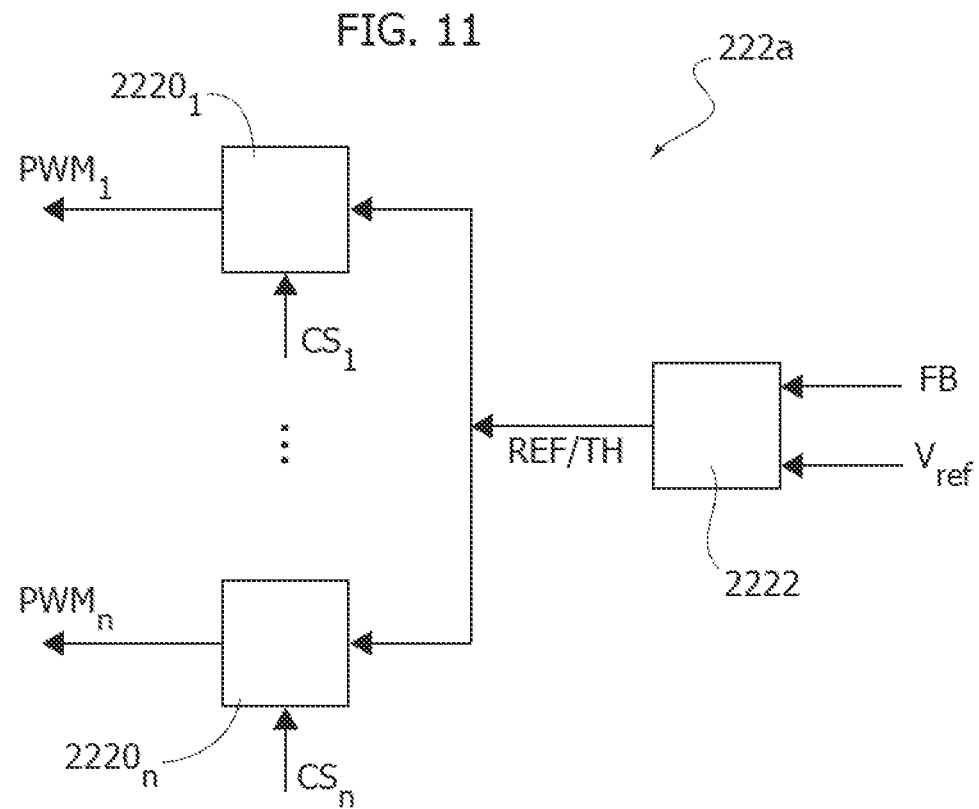
FIG. 11 is a schematic diagram illustrating a regulator circuit configured to generate PWM signals for the multi-phase buck converter of FIG. 10, in accordance with one or more embodiments.

For example, as shown in FIG. 11, in various embodiments, the PWM generator circuit 222a may comprise:
for each stage $20_1, \ldots, 20_n$, a respective phase control circuit, such as:
a regulator $2220_1, \ldots, 2220_n$ (inner loop) having at least an integral component I and/or a proportional component P, such as a PI o PID regulator, configured to vary the duty-cycle of the PWM signal PWM as a function of the error, i.e., the difference, between the average value of the current $I_L$ flowing through the respective inductance $L_1, \ldots, L_n$ during the respective switch-on interval $T_{ON1}, \ldots, T_{ONn}$ and a given reference value REF, or
a comparator $2220_1, \ldots, 2220_n$ configured to signal the end of the respective switch-on interval $T_{ON1}, \ldots, T_{ONn}$ when the instantaneous value of the current $I_L$ flowing through the respective inductance $L_1, \ldots, L_n$ during the respective interval $T_{ON1}, \ldots, T_{ONn}$ reaches a given threshold value TH; and
a common regulator circuit 2222 having at least an integral component I, such as a PI o PID regulator, configured to vary the reference value REF or the threshold value TH, respectively, as a function of the error, i.e., the difference, between the signals FB and the reference signal $V_{ref}$.

Accordingly, in various embodiments, the PWM generator circuit 222a is configured to generate a common regulation signal REF or TH for the (average or instantaneous value of the) currents flowing in the stages $20_1, \ldots, 20_n$ in order to obtain a requested output voltage $V_{out}$, but the current flow in each stage may be controlled individually. For example, in this way may be balanced the currents flowing in the various stages to the same value.

Figure 12:
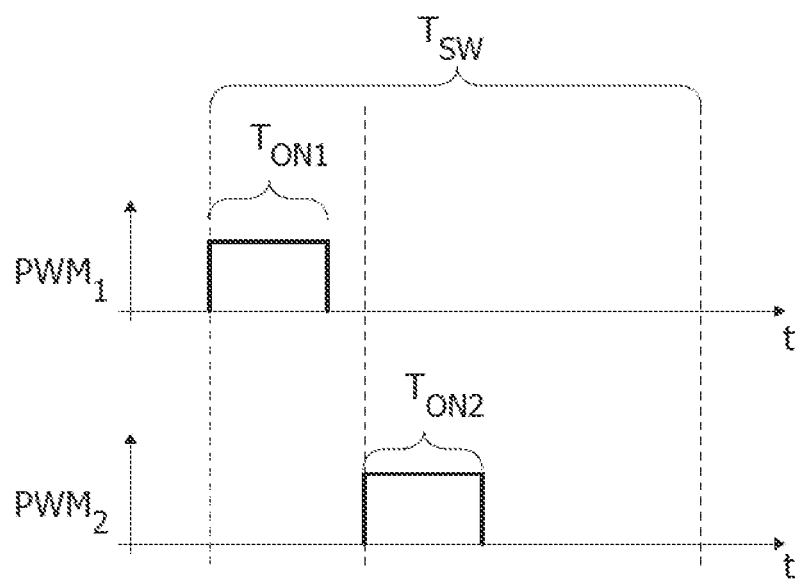
FIG. 12 is a waveform diagram illustrating operation of the regulator circuit of FIG. 11, in accordance with one or more embodiments.

As shown in FIG. 12, in various embodiments, the PWM generator circuit 222a, in particular the circuits $2220_1, \ldots, 2220_n$, may be configured to generate PWM signals $PWM_1, \ldots, PWM_n$ having the same switching period $T_{SW}$, wherein the respective switch-on period $T_{ON1}, \ldots, T_{ONn}$ is controlled via the respective circuit $2220_1, \ldots, 2220_n$. In various embodiments, in various embodiments, the PWM generator circuit 222a, in particular the circuits $2220_1, \ldots, 2220_n$, may be configured to generate phase-shifted PWM signals $PWM_1, \ldots, PWM_n$. For example, in this way also the current peaks supplied by the various stages $20_1, \ldots, 20_n$ are phase-shifted with respect to each other.

In various embodiments, the circuit 2222 may also be configured to determine a number k of stages that are to be used, whereas the other n-k stages do not switch. For example, the circuit 2222 may be configured to:
reduce the number k when the reference value REF or the threshold value TH falls below a lower threshold; and
increase the number k when the reference value REF or the threshold value TH exceeds an upper threshold.

Generally, the lower threshold and upper threshold may also be different for each value of k.

In the embodiment shown in FIG. 10, the inductors $L_1, \ldots, L_n$ and the capacitor or capacitors $C_{out}$ are represented as being external to the stages $20_1, \ldots, 20_n$ to highlight the fact that the stages $20_1, \ldots, 20_n$ and possibly the PWM generator circuit 222, the driver circuits 220 and optionally the electronic switches Q1 and Q2 may be implemented in one or more integrated circuits, whereas the inductors $L_1, \ldots, L_n$ and the capacitor or capacitors $C_{out}$ may be discrete components connected externally to such one or more integrated circuits.

Generally, also other control schemes may be implemented in the PWM generator circuit in order to generate the PWM signals $PWM_1, \ldots, PWM_n$. For example, an alternative solution is described in document "DocID030464 Rev 1," "*TN1246 Technical note: Digital multiphase constant-on-time regulator based on voltage controlled oscillator*," STMicroelectronics, 2017. A modified multiphase buck converter with the possibility of zero-voltage switching is described in U.S. patent application No. US 2019/0052165 A1, the contents of which are incorporated herein for reference.

Accordingly, a multiphase buck converter comprises a plurality of phases, wherein each phase may provide a current pulse to the output capacitor(s) $C_{out}$. Moreover, by using PWM signals $PWM_1, \ldots, PWM_n$, the current pulses may be phase shifted and the current in the phases may be balanced. Generally, as mentioned before, based on the load conditions, also only a sub-set of k phases may indeed be used.

Figure 13:
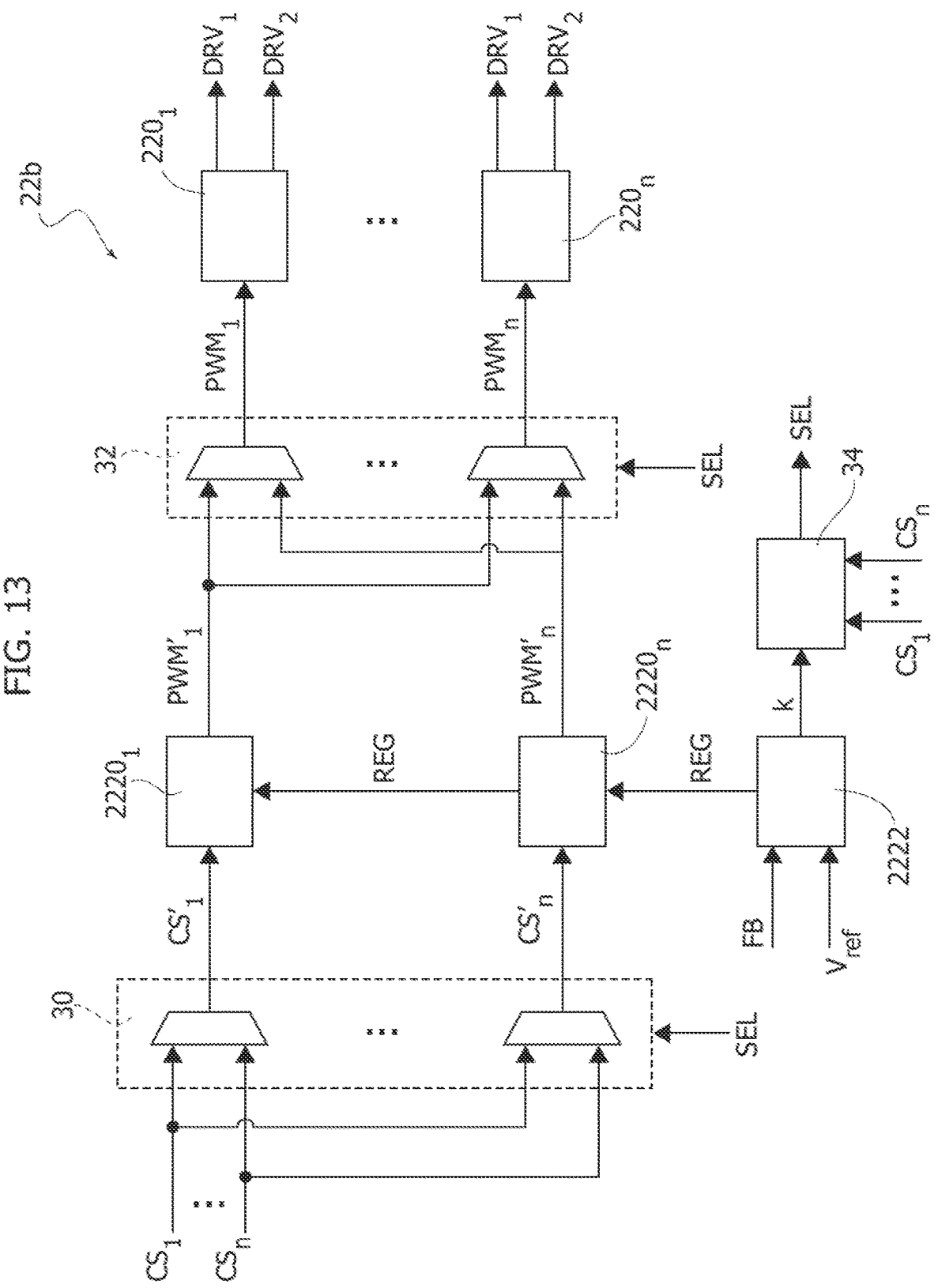
FIG. 13 is a schematic diagram illustrating a regulator circuit including two switching circuits, in accordance with one or more embodiments.

FIG. 13 shows an embodiment of a modified control circuit 22b for a multi-phase buck converter having n phases/stages. For example, such a control circuit 22b may be implemented in an integrated circuit.

Specifically, in line with the previous description, the control circuit 22b comprises:
a terminal configured to receive the feedback signal FB indicative of (and preferably proportional to) the output voltage $V_{out}$ generated by the multi-phase buck converter,
n terminals configured to receive from each stage a respective current sense signal $CS_1, \ldots, CS_n$ indicative of (and preferably proportional to) the current flowing through the inductance of the respective stage;
n terminals configured to provide a PWM signal $PWM_1, \ldots, PWM_n$ to the driver circuit 220 of the respective stage.

In various embodiments, the control circuit 22b may also comprises a terminal configured to receive the reference signal $V_{ref}$ indicative of (and preferably proportional to) the requested value of the output voltage generated by the multi-phase buck converter.

In various embodiments, as shown in FIG. 13, the integrated circuit of the control circuit 22b may also comprise for each stage a respective driver circuit $220_1, \ldots, 220_n$. Generally, as described in the foregoing, each driver circuit $220_1, \ldots, 220_n$ is configured to generate, as a function of the respective PWM signal $PWM_1, \ldots, PWM_n$, a drive signal $DRV_1$ for an electronic switch Q1 of the respective stage, and optionally a drive signal $DRV_2$ for an electronic switch Q2 of the respective stage.

Accordingly, in various embodiments, the integrated circuit of the control circuit 22b may comprise pads of a respective die or pins of a respective packaged integrated circuit for the feedback signal FB, the signal $CS_1, \ldots, CS_n$, optionally the reference signal $V_{ref}$, and either:

for the PWM signal $PWM_1, \ldots, PWM_n$; or for the drive signal $DRV_1$ and optionally the drive signal $DRV_2$.

In various embodiments, also the electronic switches Q1 and the electronic switches Q2/diodes D may be integrated in the integrated circuit. Accordingly, in this case, the signals $CS_1, \ldots, CS_n$ could be generated internally, e.g., by monitoring the voltages at the switching nodes Lx.

In the embodiment considered, the control circuit 22b comprises again a regulator circuit 2222 configured to generate a regulation value REG by varying the regulation value REG until the feedback signal FB corresponds to the reference signal $V_{ref}$. As mentioned before, the regulator circuit 2222 may comprise at least an integral component (I), and optionally a proportional (P) and/or derivative (D) component.

Moreover, in the embodiment considered, the control circuit 22b comprises n phase control circuits $2220_1, \ldots, 2220_n$ (one for each stage/phase) configured to generate a respective PWM signal $PWM_1, \ldots, PWM_n$ by varying the duty-cycle of the respective PWM signal $PWM_1, \ldots, PWM_n$ as a function of the respective current sense signal $CS_1, \ldots, CS_n$ and the regulation value REG. For example, the regulation value REG may correspond to the reference value REF of the average value of the current sense signal $CS_1, \ldots, CS_n$ or the threshold value for the instantaneous value of the current sense signal $CS_1, \ldots, CS_n$. Accordingly, each control circuits $2220_1, \ldots, 2220_n$ may be implemented with a respective comparator or an additional regulator having a P and/or I component.

Specifically, as shown in FIG. 13, indeed each of the n phase control circuits $2220_1, \ldots, 2220_n$ receives a respective current sense signal $CS'_1, \ldots, CS'_n$ and generates a respective PWM signal $PWM'_1, \ldots, PWM'_n$. In fact, in the embodiment considered, the control circuit 22b comprises also:

a first selector circuit 30 configured to select for each current sense signal $CS'_1, \ldots, CS'_n$ a respective current sense signal $CS_1, \ldots, CS_n$ as a function of a selection signal SEL, and a second selector circuit 32 configured to select for each PWM signal $PWM_1, \ldots, PWM_n$ a respective PWM signal $PWM'_1, \ldots, PWM'_n$ as a function of the selection signal SEL.

Thus, in the embodiment considered, each couple of current sense signal $CS_1, \ldots, CS_n$ and PWM signal $PWM_1, \ldots, PWM_n$ (associated with a given phase/stage) may be routed via the selector circuits 30 and 32 to a respective control circuit $2220_1, \ldots, 2220_n$.

In various embodiments, the control circuit 22b comprises thus also a selection control circuit 34 configured to generate the selection signal SEL for the selector circuits 30 and 32.

For example, the selector circuits 30 and 32 may be implemented with multiplexers or electronic switches. Generally, as will be described in the following, one or more of the control circuit $2220_1, \ldots, 2220_n$ may also be unused. In this case, the selector circuits 30 and 32 may be configured to disconnect these unused control circuit $2220_1, \ldots, 2220_n$.

Figure 14:
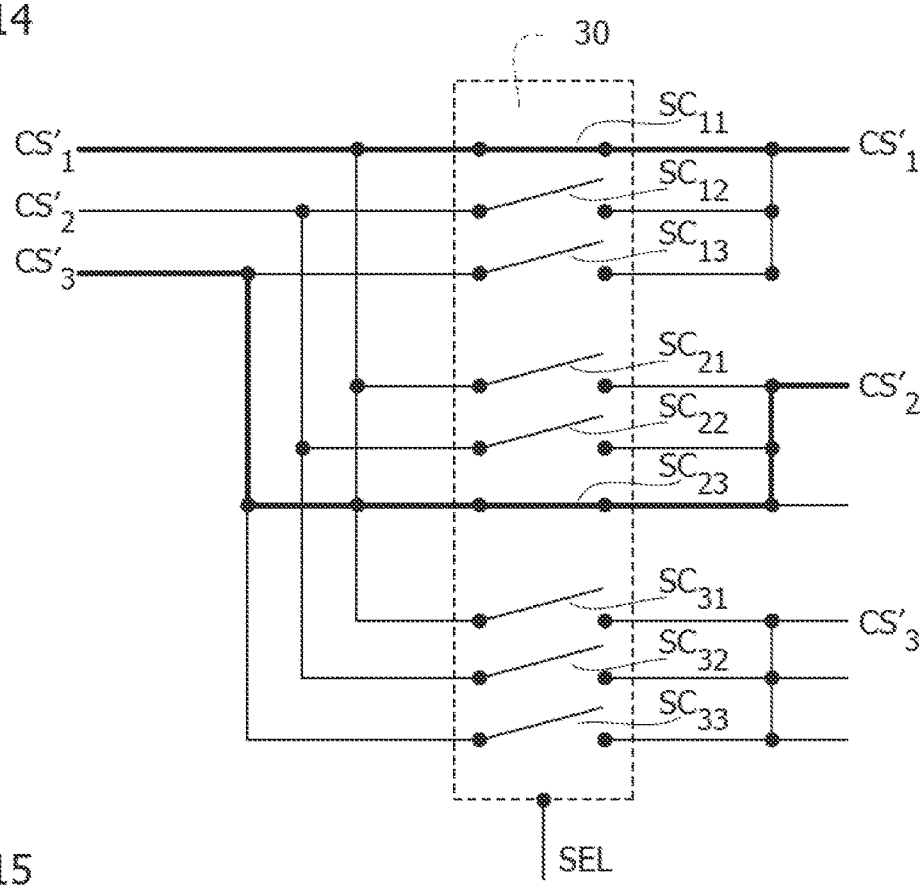
FIGS. 14 and 15 are schematic diagrams illustrating further details of the switching circuits of FIG. 13, in accordance with one or more embodiments.
Figure 15:
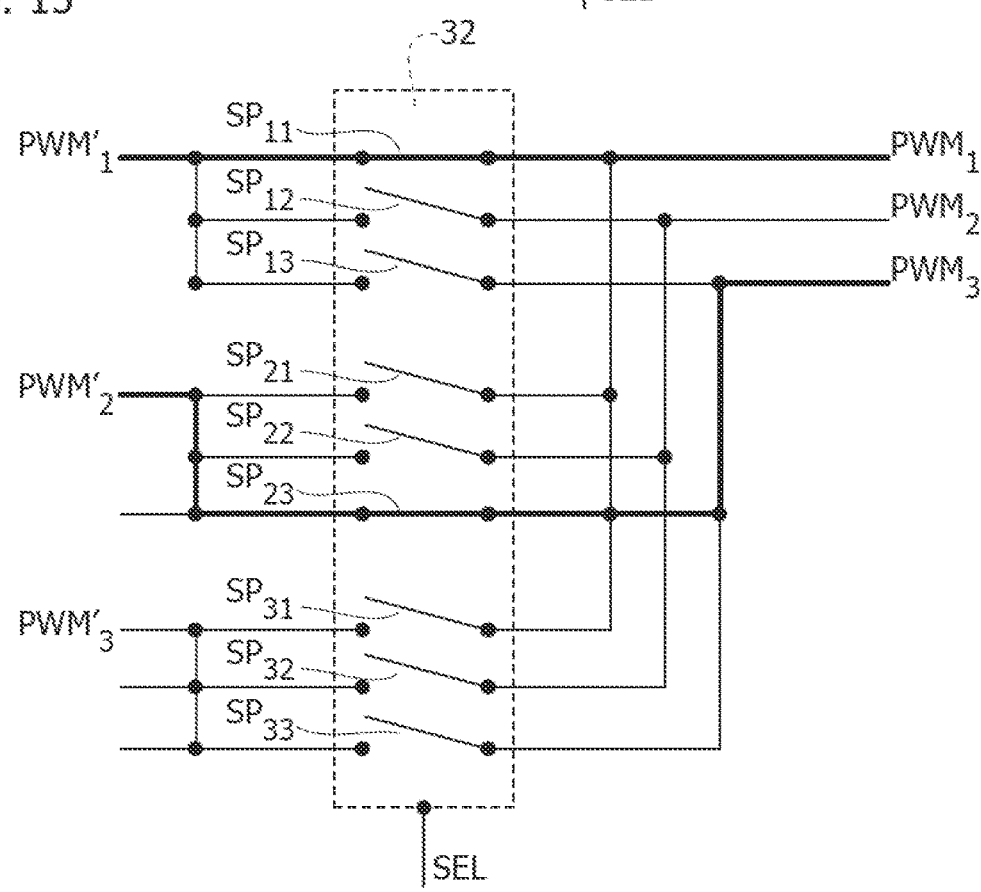

For example, FIGS. 14 and 15 show possible embodiment of the selector circuit 30 and 32.

Specifically, in the embodiment considered, each current sense signal $CS'_1, \ldots, CS'_n$ is connected via a respective electronic switch to all current sense signals $CS_1, \ldots, CS_n$, e.g., electronic switches $SC_{11}$, $SC_{12}$ and $SC_{13}$ for connecting the current sense signal $CS'_1$ to the current sense signals $CS_1$, $CS_2$, $CS_3$, electronic switches $SC_{21}$, $SC_{22}$ and $SC_{23}$ for connecting the current sense signal $CS'_2$ to the current sense signals $CS_1$, $CS_2$, $CS_3$, etc.

Similarly, in the embodiment considered, each PWM signal $PWM'_1, \ldots, PWM'_n$ is connected via a respective electronic switch to all PWM signals $PWM_1, \ldots, PWM_n$, e.g., electronic switches $SP_{11}$, $SP_{12}$ and $SP_{13}$ for connecting the PWM signal $PWM'_1$ to the PWM signal signals $PWM_1$, $PWM_2$, $PWM_3$, electronic switches $SP_{21}$, $SP_{22}$ and $SP_{23}$ for connecting the PWM signal $PWM'_2$ to the PWM signal signals $PWM_1$, $PWM_2$, $PWM_3$, etc.

Accordingly, in the embodiment considered, the selection signal SEL may be a one-hot encoded signal, which closes for each current sense signal $CS_1, \ldots, CS_n$ and each PWM signal $PWM'_1, \ldots, PWM'_n$ just one electronic switch. For example, in FIGS. 14 and 15, the current sense signal $CS_1$ and the PWM signals $PWM_1$ are connected to the phase control circuit $2220_1$, the current sense signal $CS_3$ and the PWM signal $PWM_3$ are connected to the phase control circuit $2220_2$, and the current sense signal $CS_2$ and the PWM signal $PWM_2$ are disconnected.

Figure 16:
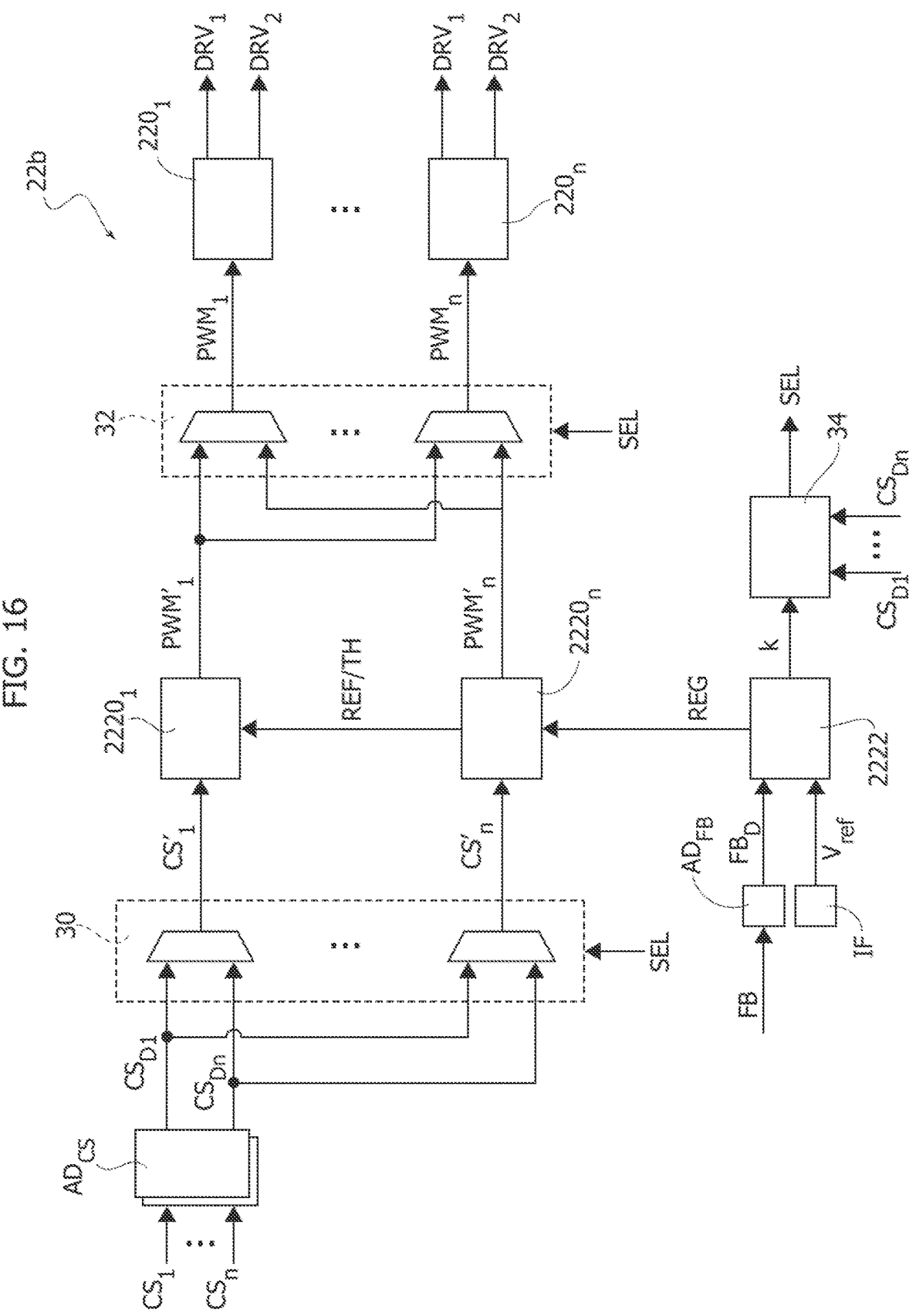
FIG. 16 is a schematic diagram illustrating a digital implementation of the regulator circuit of FIG. 13, in accordance with one or more embodiments.

Generally, as shown in FIG. 16, at least part of the control circuit 22b may also be implemented via a digital processing circuit, e.g., comprising a dedicated hardware circuit and/or a micro-processor configured to implement one or more operations of the control circuit 22a via software instructions.

For example, in FIG. 16, the control circuit 22b comprises one or more analog-to-digital converters $AD_{CS}$ configured to generate digital samples $CS_{D1}, \ldots, CS_{D2}$ of the current sense signal $CS_1, \ldots, CS_n$. Similarly, the control circuit 22b may comprises an analog-to-digital converters $AD_{FB}$ configured to generate a digital sample of the feedback signal FB. For example, in a digital implementation, the control circuit 22b may comprise a communication interface IF for receiving the reference signal $V_{ref}$. Accordingly, in general, the circuits 30, 32, 34, 2220 and/or 2222 may be implemented via digital circuits receiving respective digital values. In fact, the PWM signal essentially corresponds already to a digital/binary signal.

In the following will now be described possible embodiments of the selection control circuit 34.

For example, in various embodiments, which may be particularly suitable in case the control circuit 22b comprises also a communication interface IF, such as a serial communication interface, e.g., an I²C (Inter-Integrated Circuit) or SPI (Serial Peripheral Interface Bus) communication interface, the selection control circuit 34 may be configured to use a predetermined assignment for the connection of the current sense signal $CS_1, \ldots, CS_n$ and the PWM signals $PWM_1, \ldots, PWM_n$ to the phase control circuits $2220_1, \ldots, 2220_n$. For example, the predetermined assignment may be received via the communication interface IF.

For example, with respect to FIGS. 14 and 15, the selection control circuit 34 may receive via the communication interface IF data specifying that:
- the current sense signal $CS_1$ and the PWM signals $PWM_1$ are connected to the phase control circuit $2220_1$,
- the current sense signal $CS_3$ and the PWM signal $PWM_3$ are connected to the phase control circuit $2220_2$, and
- the current sense signal $CS_2$ and the PWM signal $PWM_2$ is disconnected.

For example, in various embodiments, the data may correspond to the bit sequence of the selection signal SEL, e.g., "100 001 000" or an encoded sequence "01 11 00," i.e., corresponding to the decimal values "1, 3, 0," which is decoded by the selection control circuit 34 in order to generate the selection signal SEL.

In various embodiments, the control circuit 22b may use only k phase control circuits $2220_1, \ldots, 2220_n$. For example, as described in the foregoing, the regulator circuit 2222 may vary the number k based on the required or desired load conditions. Accordingly, in various embodiments, the number k of active phase control circuits $2220_1, \ldots, 2220_n$ is smaller than the number n of phases of the multiphase buck converter.

For example, this is also shown in FIGS. 13 and 16, where the selection control circuit 34 receives the value k from the regulator circuit 2222.

Specifically, in this case, the selection control circuit 34 may drive the selector circuits 30 and 32 in order to:
- compensate a fault of a phase of the multiphase buck converter, by activating a different phase of the multiphase buck converter; and/or
- switch dynamically the activated phases in order to reduce the stress on the activated phases.

For example, as shown in FIGS. 13 and 16, in order to determine a fault of a given phase, the selection control circuit 34 may monitor the current sense signals $CS_1, \ldots, CS_n$ (or the respective digital samples). For example, in case a given phase is activated, i.e., connected to an activated phase control circuit $2220_1, \ldots, 2220_n$ and the respective current sense signals $CS_1, \ldots, CS_n$ has values being too small (open load condition) and/or high (short-circuit condition), the selector circuit may connect a deactivated phase to the respective phase control circuit $2220_1, \ldots, 2220_n$.

Figure 17:
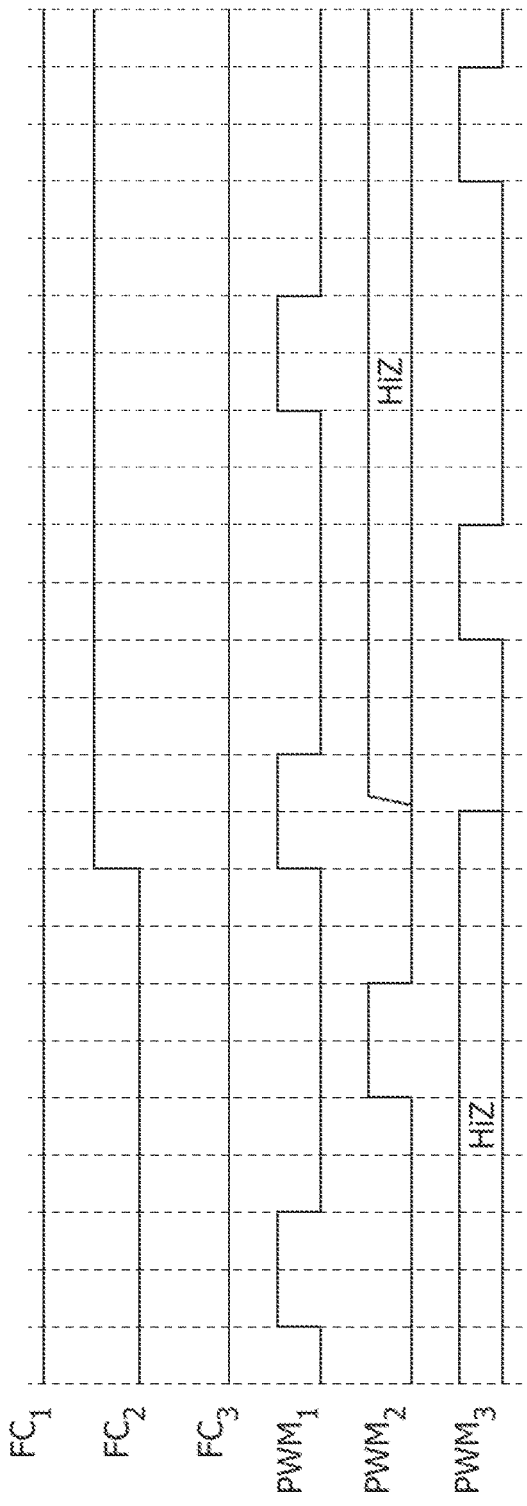
FIGS. 17 and 18 are waveform diagrams illustrating operations of the regulator circuits of FIGS. 13 and 16, in accordance with one or more embodiments.

For example, with respect to the embodiment described in the foregoing, wherein the phases 1 and 3 are activated and connected to the activated phase control circuit $2220_1$ and $2220_2$, and the phase 2 is deactivated, i.e., k=2 (and n is at least 3), the selection control circuit 34 may be configured to:
- monitor (at least) the current sense signals $CS_1$ and $CS_3$;
- compare the current sense signals $CS_1$ and $CS_3$ with a lower threshold and/or an upper threshold;
- in response to determining that the current sense signal $CS_1$ is smaller than the lower threshold or greater than the upper threshold, set the selection signal SEL in order to deactivate the phase 1 and connect the previously deactivated phase 2 to the active control circuit $2220_1$; and
- in response to determining that the current sense signal $CS_3$ is smaller than the lower threshold or greater than the upper threshold, set the selection signal SEL in order to deactivate the phase 3 and connect the previously deactivated phase 2 to the active control circuit $2220_2$;

For example, FIG. 17 shows the example wherein two of three phases are active, i.e., k=2 and n=3, and the selection control circuit 34 is configured to:
- assign the phase 1 to the phase control circuit $2220_1$ and the phase 2 to the phase control circuit $2220_2$;
- set a respective fault condition signal $FC_3$, $FC_2$, $FC_3$ for each of the phases 1 to 3, when the respective current sense signals $CS_1, \ldots, CS_n$ indicates a fault; and
- in response to determining that the signal $FC_2$ indicates a fault of the phase 2, vary the selection signal in order to connect the phase 3 to the phase control circuit $2220_2$.

Specifically, as shown in FIG. 17, due to the fact that the phase control circuit $2220_2$ is first used for the phase 2 and then for the phase 3, the signal $PWM_2$ and (once activated) the signal $PWM_3$ use the same phase shift. Generally, once having switched to another phase, the phase control circuit $2220_2$ and/or the regulator circuit 2222 may again perform the regulation function in order to obtain the requested output voltage.

For example, in this way, by adding a single deactivated/unused phase, which usually would not be required, the control circuit 22b may compensate the fault of any of the k activated phases, by disconnecting the phase having a fault and connecting the previously deactivated/unused phase to the phase control circuit previously associated with the phase having a fault. Generally, the selection control circuit 34 could also perform a reordering of all connection of the k phases to the k activated phase control circuits $2220_1, \ldots, 2220_n$.

In fact, as mentioned before, the selection control circuit 34 may also be configured to dynamically reorder the active phase. Specifically, as mentioned before, the regulator circuit 2222 may adapt the number k of active phases to the current load condition, e.g., in order to optimize the efficiency of the power conversion. However, in a conventional multiphase converter this may give rise to an overstress on the first phases, which are usually always activated.

Figure 18:
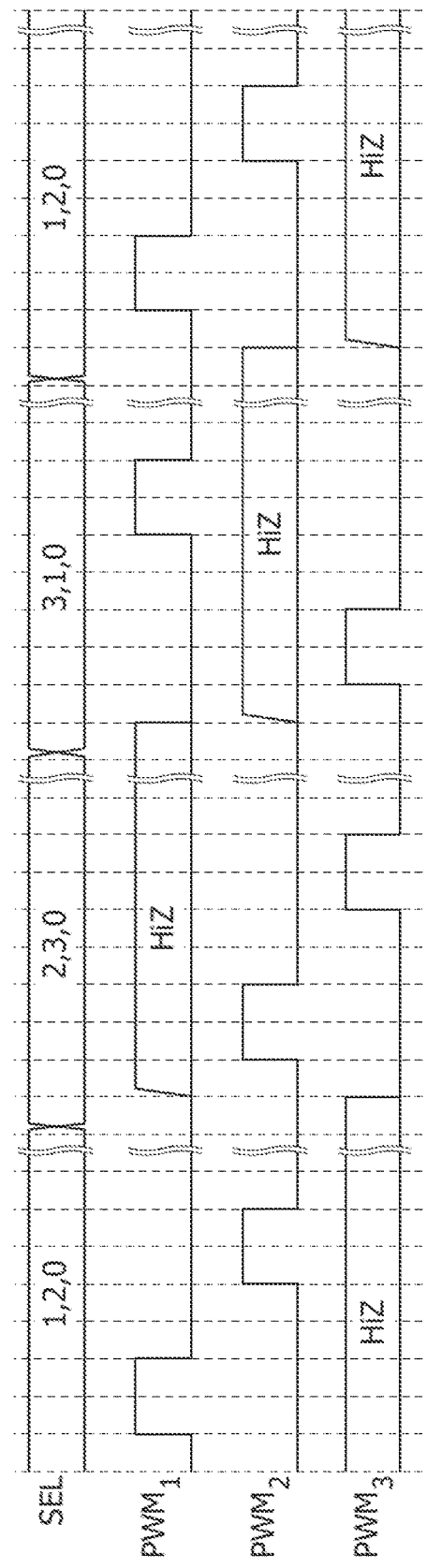

Conversely, as shown in FIG. 18, the phase selection circuit may reorder the phase by periodically connecting different subsets of k phases to the k activated phase control circuits $2220_1, \ldots, 2220_n$.

For example, in the embodiment shown in FIG. 18, two of three phase control circuits $2220_1, \ldots, 2220_n$ are active, i.e., k=2 and n=3. For example, in this case, and assuming that no faults are detected (see, e.g., the description of FIG. 17) the selection control circuit 34 may change the selection signal SEL in order to repeat the following operations periodically:
- connect the phases 1 and 2 to the active phase control circuits $2220_1$ and $2220_2$;
- next connect the phases 2 and 3 to the active phase control circuits $2220_1$ and $2220_2$;
- next connect the phases 3 and 1 to the active phase control circuits $2220_1$ and $2220_2$.

Accordingly, various embodiments of the present disclosure may have one or more of the following advantages:
- flexibility is increased, because the external component (the inductances L and optionally the electronic switches Q1 and electronic switches Q2/didoes D) are not bound by constraints in the phase assignment;
- the stress on external components may be reduced, thereby increasing their lifetime and improving the performance of the system;
- the fault management is improved with a minimum number of external component redundancy.

Of course, without prejudice to the principle of the disclosure, the details of construction and the embodiments may vary widely with respect to what has been described and illustrated herein purely by way of example, without thereby departing from the scope of the present disclosure.

For example, while in the previous description the activated phase control circuits receive (in addition to the regulation signal REG) just one signal from a respective stage of the multi-phase buck converter (i.e., the respective current sense signal), the phase control circuits could also receive further signals from the respective stage, such as a signal indicative of the temperature of the respective stage. In this case, the selector circuit 32 may also be used to route the additional signals associated with the same stage to a given phase control circuit.

Additionally or alternatively, such additional signals may be used by the selection control circuit 34 in order determine possible malfunctions of a given stage, such as an overtemperature condition, and possibly connect the respective phase control circuit to another stage.

A control circuit (22b) for a multiphase buck converter, may be summarized as including a feedback terminal configured to receive a feedback signal (FB) indicative of an output voltage ($V_{out}$) generated by said multi-phase buck converter, a plurality of current-sense terminals, wherein each current-sense terminal is configured to receive from a respective stage of said multiphase buck converter a respective first current sense signal ($CS_1, \ldots, CS_n$) indicative of the current flowing through an inductance of the respective stage; a plurality of control terminals, wherein the number (n) of said control terminals corresponds to the number (n) of said current-sense terminals, wherein each control terminal is configured to provide a respective first Pulse-Width Modulated, PWM, signal ($PWM_1, \ldots, PWM_n$) to a driver circuit (220) of a respective stage of said multiphase buck converter, and each first PWM signal ($PWM_1, \ldots, PWM_n$) is associated with a respective first current sense signal ($CS_1, \ldots, CS_n$), a regulator circuit (2222) configured to generate a regulation signal (REG) by varying said regulation signal (REG) until said feedback signal (FB) corresponds to a reference signal ($V_{ref}$); a plurality of phase control circuits ($2220_1, \ldots, 2220_n$), wherein each phase control circuit ($2220_1, \ldots, 2220_n$) is configured to receive a respective second current sense signal ($CS'_1, \ldots, CS'_n$) and generate a respective second PWM signal ($PWM'_1, \ldots, PWM'_n$) by varying the duty-cycle of the respective second PWM signal ($PWM'_1, \ldots, PWM'_n$) as a function of the respective second current sense signal ($CS'_1, \ldots, CS'_n$) and said regulation signal (REG); a first selector circuit (30) and a second selector circuit (32) configured to receive a selection signal (SEL) and, in response to said selection signal (SEL), selectively connect each phase control circuit ($2220_1, \ldots, 2220_n$) of a subset of a given number (k) of said phase control circuits ($2220_1, \ldots, 2220_n$) via the respective second PWM signal ($PWM'_1, \ldots, PWM'_n$) to a first PWM signal ($PWM_1, \ldots, PWM_n$), and via the respective second current sense signal ($CS'_1, \ldots, CS'_n$) to the first current sense signal ($CS_1, \ldots, CS_n$) associated with the first PWM signal ($PWM_1, \ldots, PWM_n$) connected to the respective second PWM signal ($PWM'_1, \ldots, PWM'_n$); and a selection control circuit (34) configured to generate said selection signal (SEL), wherein said selection control circuit (34) is configured to in a first switching mode, set said selection signal (SEL) in order to connect said given number (k) of said phase control circuits ($2220_1, \ldots, 2220_n$) to a first set of first PWM signals ($PWM_1, \ldots, PWM_n$) and associated first current sense signals ($CS_1, \ldots, CS_n$), and in a second switching mode, set said selection signal (SEL) in order to connect said given number (k) of said phase control circuits ($2220_1, \ldots, 2220_n$) to a second set of first PWM signals ($PWM_1, \ldots, PWM_n$) and associated first current sense signals ($CS_1, \ldots, CS_n$).

Said regulator circuit (2222) may be configured to determine, as a function of said regulation signal (REG), a number of phase control circuits ($2220_1, \ldots, 2220_n$) to be activated, and activate said number of phase control circuits ($2220_1, \ldots, 2220_n$) to be activated; wherein said given number (k) corresponds to the number of activated phase control circuits ($2220_1, \ldots, 2220_n$).

The number of phase control circuits ($2220_1, \ldots, 2220_n$) corresponds to or may be smaller than said number (n) of current-sense terminals.

Said control circuit (22b) may include a communication interface (IF), and wherein said selection control circuit (34) may be configured to activate said first switching mode or said second switching mode as a function of a control signal received via said communication interface (IF).

Said selection control circuit (34) may be configured to select said first set of first PWM signals ($PWM_1, \ldots, PWM_n$) and associated first current sense signals ($CS_1, \ldots, CS_n$) and/or said second set of first PWM signals ($PWM_1, \ldots, PWM_n$) and associated first current sense signals ($CS_1, \ldots, CS_n$) as a function of said control signal received via said communication interface (IF).

Said selection control circuit (34) may be configured to activate said first switching mode and monitor said first subset of first current sense signals ($CS_1, \ldots, CS_n$) connected to said given number (k) of said phase control circuits ($2220_1, \ldots, 2220_n$); determine whether a monitored first current sense signal ($CS_1, \ldots, CS_n$) may be greater than an upper threshold and/or smaller than a lower threshold, and in response to determining that said monitored first current sense signal ($CS_1, \ldots, CS_n$) may be greater than said upper threshold or smaller than said lower threshold, activate said second switching mode, wherein said second set of first current sense signals ($CS_1, \ldots, CS_n$) does not comprise said monitored first current sense signal ($CS_1, \ldots, CS_n$).

Said selection control circuit (34) may be configured to periodically activate said first switching mode and said second switching mode.

Said first selector circuit (30) may include a first plurality of electronic switches for connecting each second current sense signal ($CS'_1, \ldots, CS'_n$) to each first current sense signal ($CS_1, \ldots, CS_n$), and wherein said second selector circuit (30) may include a second plurality of electronic switches for connecting each second PWM signal ($PWM'_1, \ldots, PWM'_n$) to each first PWM signal ($PWM_1, \ldots, PWM_n$).

The control circuit may include a plurality of driver circuits ($220_1, \ldots, 220_n$), wherein the number (n) of said driver circuits ($220_1, \ldots, 220_n$) corresponds to the number of said control terminals, and wherein each driver circuit ($220_1, \ldots, 220_n$) may be configured to receive a respective PWM signal ($PWM_1, \ldots, PWM_n$) and generate a respective first drive signal ($DRV_1$) for a first electronic switch (Q1) of the respective stage, and optionally a respective second drive signal ($DRV_2$) for a second electronic switch (Q2) of the respective stage.

Said regulator circuit (2222) may be a regulator comprising an integral component (I), and optionally a proportional (P) and/or derivative (D) component.

Each phase control circuits ($2220_1, \ldots, 2220_n$) may include either a comparator configured to signal the end of a switch-on interval ($T_{ON}$) of the respective second PWM signal ($PWM'_1, \ldots, PWM'_n$) when the instantaneous value of the respective second current sense signal ($CS'_1, \ldots, CS'_n$) reaches said regulation signal (REG) during said switch-on interval ($T_{ON}$), whereby said regulation signal (REG) represents a threshold value (TH), or a further regulator having an integral component and/or a proportional component, and configured to vary the duty-cycle of the respective second PWM signal ($PWM'_1, \ldots, PWM'_n$) as a function of the difference between the average value during said switch-on interval ($T_{ON}$) of the respective second current sense signal ($CS'_1, \ldots, CS'_n$) and said regulation signal (REG), whereby said regulation signal (REG) represents a reference value (REF).

An integrated circuit may be summarized as including a control circuit (22b) according to any of the previous claims.

A multiphase buck converter may be summarized as including a first (200a) and a second (200b) input terminal configured to receive an input voltage ($V_{in}$); a first (202a) and a second (202b) output terminal configured to provide said output voltage ($V_{out}$); a capacitor ($C_{out}$) connected between said first (202a) and said second (202b) output terminals; a feedback circuit (24) configured to generate a feedback signal (FB) indicative of said output voltage ($V_{out}$); a plurality of stages (20), each stage including an inductance (L), wherein a first terminal of said inductance (L) is connected to said first output terminal (202a), a first electronic switch (Q1) and either a second electronic switch (Q2) or a diode connected between said first (200a) and said second (200b) input terminals and configured to selectively connect a second terminal of said inductance (L) to said first input terminal (200a) or said second input terminal (200b), a driver circuit (220) configured to receive a respective first PWM signal ($PWM_1, \ldots, PWM_n$) and generate a respective first drive signal ($DRV_1$) for said first electronic switch (Q1), and optionally a respective second drive signal ($DRV_2$) for said second electronic switch (Q2), and a current sensor (26, 26a) configured to generate a respective first current sense signal ($CS_1, \ldots, CS_n$) indicative of the current flowing through the respective inductance (L); and a control circuit (222b) according to any of the previous claims 1 to 11.

A method of operating a multiphase buck converter via a control circuit according to any of the previous claims 1 to 11, may be summarized as including in a first switching mode, set said selection signal (SEL) in order to connect said given number (k) of said phase control circuits ($2220_1, \ldots, 2220_n$) to a first set of first PWM signals ($PWM_1, \ldots, PWM_n$) and associated first current sense signals ($CS_1, \ldots, CS_n$), and in a second switching mode, set said selection signal (SEL) in order to connect said given number (k) of said phase control circuits ($2220_1, \ldots, 2220_n$) to a second set of first PWM signals ($PWM_1, \ldots, PWM_n$) and associated first current sense signals ($CS_1, \ldots, CS_n$).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for a multiphase buck converter, comprising:
  a feedback terminal configured to receive a feedback signal indicative of an output voltage generated by the multiphase buck converter;
  a plurality of current-sense terminals, each of the current-sense terminals configured to receive from a respective stage of the multiphase buck converter a respective first current sense signal indicative of the current flowing through an inductance of the respective stage;
  a plurality of control terminals, wherein a number of the control terminals corresponds to a number of the current-sense terminals, wherein each control terminal is configured to provide a respective first Pulse-Width Modulated (PWM) signal to a driver circuit of a respective stage of the multiphase buck converter, and each first PWM signal is associated with a respective first current sense signal;
  a regulator circuit configured to generate a regulation signal by varying the regulation signal until the feedback signal corresponds to a reference signal;
  a plurality of phase control circuits, wherein each phase control circuit is configured to receive a respective second current sense signal and generate a respective second PWM signal by varying a duty-cycle of the respective second PWM signal as a function of the respective second current sense signal and the regulation signal;
  a first selector circuit and a second selector circuit configured to receive a selection signal and, in response to the selection signal, selectively connect each phase control circuit of a subset of a given number of the phase control circuits via the respective second PWM signal to a first PWM signal, and via the respective second current sense signal to the first current sense signal associated with the first PWM signal connected to the respective second PWM signal; and
  a selection control circuit configured to generate the selection signal, wherein the selection control circuit is configured to:
    in a first switching mode, set the selection signal in order to connect the given number of the phase control circuits to a first set of first PWM signals and associated first current sense signals, and
    in a second switching mode, set the selection signal in order to connect the given number of the phase control circuits to a second set of first PWM signals and associated first current sense signals.

2. The control circuit according to claim 1, wherein the regulator circuit is configured to:
  determine, as a function of the regulation signal, a number of phase control circuits to be activated; and
  activate the number of phase control circuits to be activated,
  wherein the given number corresponds to the number of activated phase control circuits.

3. The control circuit according to claim 1, wherein the number of phase control circuits corresponds to or is smaller than the number of current-sense terminals.

4. The control circuit according to claim 1, wherein the control circuit includes a communication interface, and wherein the selection control circuit is configured to activate the first switching mode or the second switching mode as a function of a control signal received via the communication interface.

5. The control circuit according to claim 4, wherein the selection control circuit is configured to select the first set of first PWM signals and associated first current sense signals or the second set of first PWM signals and associated first current sense signals as a function of the control signal received via the communication interface.

6. The control circuit according to claim 1, wherein the selection control circuit is configured to:
   activate the first switching mode and monitor a first subset of the first current sense signals connected to the given number of the phase control circuits;
   determine whether a monitored first current sense signal is greater than an upper threshold or smaller than a lower threshold; and
   in response to determining that the monitored first current sense signal is greater than the upper threshold or smaller than the lower threshold, activate the second switching mode, wherein the second set of first current sense signals does not include the monitored first current sense signal.

7. The control circuit according to claim 1, wherein the selection control circuit is configured to periodically activate the first switching mode and the second switching mode.

8. The control circuit according to claim 1, wherein the first selector circuit includes a first plurality of electronic switches configured to connect each second current sense signal to each first current sense signal, and wherein the second selector circuit includes a second plurality of electronic switches configured to connect each second PWM signal to each first PWM signal.

9. The control circuit according to claim 1, comprising:
   a plurality of driver circuits, wherein a number of the driver circuits corresponds to the number of the control terminals, and wherein each driver circuit is configured to receive a respective PWM signal and generate a respective first drive signal for a first electronic switch of the respective stage.

10. The control circuit according to claim 9, wherein each of the driver circuits is configured to receive a respective second drive signal for a second electronic switch of the respective stage.

11. The control circuit according to claim 1, wherein the regulator circuit is a regulator including an integral component, and at least one of a proportional or a derivative component.

12. The control circuit according to claim 1, wherein each of the phase control circuits includes at least one of:
   a comparator configured to signal an end of a switch-on interval of the respective second PWM signal when an instantaneous value of the respective second current sense signal reaches the regulation signal during the switch-on interval, whereby the regulation signal represents a threshold value, or
   a further regulator having an integral component or a proportional component, and configured to vary the duty-cycle of the respective second PWM signal as a function of a difference between an average value during the switch-on interval of the respective second current sense signal and the regulation signal, whereby the regulation signal represents a reference value.

13. An integrated circuit, comprising:
   a control circuit for a multiphase buck converter, the control circuit including:
      a feedback terminal configured to receive a feedback signal indicative of an output voltage generated by the multiphase buck converter;
      a plurality of current-sense terminals, each of the current-sense terminals configured to receive from a respective stage of the multiphase buck converter a respective first current sense signal indicative of the current flowing through an inductance of the respective stage;
      a plurality of control terminals, wherein a number of the control terminals corresponds to a number of the current-sense terminals, wherein each control terminal is configured to provide a respective first Pulse-Width Modulated (PWM) signal to a driver circuit of a respective stage of the multiphase buck converter, and each first PWM signal is associated with a respective first current sense signal;
      a regulator circuit configured to generate a regulation signal by varying the regulation signal until the feedback signal corresponds to a reference signal;
      a plurality of phase control circuits, wherein each phase control circuit is configured to receive a respective second current sense signal and generate a respective second PWM signal by varying a duty-cycle of the respective second PWM signal as a function of the respective second current sense signal and the regulation signal;
      a first selector circuit and a second selector circuit configured to receive a selection signal and, in response to the selection signal, selectively connect each phase control circuit of a subset of a given number of the phase control circuits via the respective second PWM signal to a first PWM signal, and via the respective second current sense signal to the first current sense signal associated with the first PWM signal connected to the respective second PWM signal; and
      a selection control circuit configured to generate the selection signal, wherein the selection control circuit is configured to:
         in a first switching mode, set the selection signal in order to connect the given number of the phase control circuits to a first set of first PWM signals and associated first current sense signals, and
         in a second switching mode, set the selection signal in order to connect the given number of the phase control circuits to a second set of first PWM signals and associated first current sense signals.

14. The integrated circuit according to claim 13, wherein the regulator circuit is configured to:
   determine, as a function of the regulation signal, a number of phase control circuits to be activated; and
   activate the number of phase control circuits to be activated,
   wherein the given number corresponds to the number of activated phase control circuits.

15. The integrated circuit according to claim 13, wherein the number of phase control circuits corresponds to or is smaller than the number of current-sense terminals.

16. The integrated circuit according to claim 13, wherein the control circuit includes a communication interface, and wherein the selection control circuit is configured to activate the first switching mode or the second switching mode as a function of a control signal received via the communication interface.

17. A multiphase buck converter, comprising:
   a first and a second input terminal configured to receive an input voltage;
   a first and a second output terminal configured to provide an output voltage;
   a capacitor connected between the first and the second output terminals;
   a feedback circuit configured to generate a feedback signal indicative of the output voltage; and a plurality of stages, each of the stages including:
- an inductance, wherein a first terminal of the inductance is connected to the first output terminal,
- a first electronic switch and at least one of a second electronic switch or a diode connected between the first and the second input terminals and configured to selectively connect a second terminal of the inductance to the first input terminal or the second input terminal,
- a driver circuit configured to receive a respective first PWM signal and generate a respective first drive signal for the first electronic switch, and
- a current sensor configured to generate a respective first current sense signal indicative of a current flowing through the respective inductance; and
- a control circuit, including:
  - a feedback terminal configured to receive a feedback signal indicative of an output voltage generated by the multiphase buck converter;
  - a plurality of current-sense terminals, each of the current-sense terminals configured to receive from a respective stage of the multiphase buck converter a respective first current sense signal indicative of the current flowing through an inductance of the respective stage;
  - a plurality of control terminals, wherein a number of the control terminals corresponds to a number of the current-sense terminals, wherein each control terminal is configured to provide a respective first Pulse-Width Modulated (PWM) signal to a driver circuit of a respective stage of the multiphase buck converter, and each first PWM signal is associated with a respective first current sense signal;
  - a regulator circuit configured to generate a regulation signal by varying the regulation signal until the feedback signal corresponds to a reference signal;
  - a plurality of phase control circuits, wherein each phase control circuit is configured to receive a respective second current sense signal and generate a respective second PWM signal by varying a duty-cycle of the respective second PWM signal as a function of the respective second current sense signal and the regulation signal;
  - a first selector circuit and a second selector circuit configured to receive a selection signal and, in response to the selection signal, selectively connect each phase control circuit of a subset of a given number of the phase control circuits via the respective second PWM signal to a first PWM signal, and via the respective second current sense signal to the first current sense signal associated with the first PWM signal connected to the respective second PWM signal; and
  - a selection control circuit configured to generate the selection signal, wherein the selection control circuit is configured to:
    - in a first switching mode, set the selection signal in order to connect the given number of the phase control circuits to a first set of first PWM signals and associated first current sense signals, and
    - in a second switching mode, set the selection signal in order to connect the given number of the phase control circuits to a second set of first PWM signals and associated first current sense signals.

18. The multiphase buck converter according to claim 17, wherein the driver circuit of each of the plurality of stages is configured to generate a respective second drive signal for the second electronic switch.

19. A method of operating a multiphase buck converter via a control circuit, the control circuit including:
- a feedback terminal configured to receive a feedback signal indicative of an output voltage generated by the multiphase buck converter;
- a plurality of current-sense terminals, each of the current-sense terminals configured to receive from a respective stage of the multiphase buck converter a respective first current sense signal indicative of the current flowing through an inductance of the respective stage;
- a plurality of control terminals, wherein a number of the control terminals corresponds to a number of the current-sense terminals, wherein each control terminal is configured to provide a respective first Pulse-Width Modulated (PWM) signal to a driver circuit of a respective stage of the multiphase buck converter, and each first PWM signal is associated with a respective first current sense signal;
- a regulator circuit configured to generate a regulation signal by varying the regulation signal until the feedback signal corresponds to a reference signal;
- a plurality of phase control circuits, wherein each phase control circuit is configured to receive a respective second current sense signal and generate a respective second PWM signal by varying a duty-cycle of the respective second PWM signal as a function of the respective second current sense signal and the regulation signal;
- a first selector circuit and a second selector circuit configured to receive a selection signal and, in response to the selection signal, selectively connect each phase control circuit of a subset of a given number of the phase control circuits via the respective second PWM signal to a first PWM signal, and via the respective second current sense signal to the first current sense signal associated with the first PWM signal connected to the respective second PWM signal; and
- a selection control circuit configured to generate the selection signal, the method comprising:
  - in a first switching mode, setting the selection signal in order to connect the given number of the phase control circuits to a first set of first PWM signals and associated first current sense signals; and
  - in a second switching mode, setting the selection signal in order to connect the given number of the phase control circuits to a second set of first PWM signals and associated first current sense signals.

20. The method according to claim 19, further comprising:
- determining, by the regulator circuit, a number of phase control circuits to be activated based on the regulation signal; and
- activating, by the regulator circuit, the number of phase control circuits to be activated,
- wherein the given number corresponds to the number of activated phase control circuits.

* * * * *